United States Patent
Fries et al.

(10) Patent No.: US 12,018,559 B2
(45) Date of Patent: Jun. 25, 2024

(54) METHODS AND SYSTEMS FOR FLAGGING EVENTS IN A TIME SERIES AND EVALUATING A DOWNHOLE OPERATION

(71) Applicant: Schlumberger Technology Corporation, Sugar Land, TX (US)

(72) Inventors: Sebastien Fries, Clamart (FR); Tianjun Hou, Clamart (FR); Amine Ennaifer, Melun (FR); Lei Jiang, Beijing (CN); Josselin Kherroubi, Clamart (FR); Hadrien Dumont, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 336 days.

(21) Appl. No.: 16/879,947

(22) Filed: May 21, 2020

(65) Prior Publication Data
US 2020/0370418 A1  Nov. 26, 2020

Related U.S. Application Data

(60) Provisional application No. 62/850,637, filed on May 21, 2019.

(51) Int. Cl.
*E21B 47/06*  (2012.01)
*E21B 47/12*  (2012.01)
(Continued)

(52) U.S. Cl.
CPC .............. *E21B 47/06* (2013.01); *E21B 47/12* (2013.01); *E21B 49/10* (2013.01); *G01V 11/002* (2013.01)

(58) Field of Classification Search
CPC ........... G06N 20/00; G06N 7/00; G06N 5/00; G06N 3/00; G01V 11/00; G01V 11/002;
(Continued)

(56) References Cited

U.S. PATENT DOCUMENTS 7,103,222 B2 * 9/2006 Peker .................... G06F 16/739
  382/181
7,243,537 B2 * 7/2007 Proett ................... E21B 49/088
  73/152.51
(Continued)

FOREIGN PATENT DOCUMENTS

WO  WO-2016154723 A1 * 10/2016 ............. E21B 21/00
WO  WO-2018236238 A1 * 12/2018 ............. G06Q 50/02

OTHER PUBLICATIONS

Bhattacharya, D., Mukhoti, J., & Konar, A. (2019). Learning regularity in an economic time-series for structure prediction. Applied Soft Computing, 76, 31-44.
(Continued)

*Primary Examiner* — Alvaro E Fortich
*Assistant Examiner* — Martin Walter Braunlich
(74) *Attorney, Agent, or Firm* — Jeffrey D. Frantz

(57) ABSTRACT

The disclosure relates to a method for flagging at least an event of interest in an unlabeled time series of a parameter relative to a wellsite (including to the well, formation or a wellsite equipment), wherein the time series of the parameter is a signal of the parameter as a function of time. The disclosure also relates to a method for evaluation a downhole operation such as a pressure test using a pressure time series. Such methods comprises collecting a time series, extracting at least an unlabeled subsequence of predetermined duration in the time series, and assigning an event of interest a label, in particular representative of the status of the downhole operation, to at least one of the unlabeled subsequences. A command may be sent to a wellsite operating system based on assigned label.

19 Claims, 11 Drawing Sheets

(51) Int. Cl.
*E21B 49/10* (2006.01)
*G01V 11/00* (2006.01)

(58) Field of Classification Search
CPC .......... E21B 47/06; E21B 47/12; E21B 47/00; E21B 49/10
See application file for complete search history.

(56) References Cited

U.S. PATENT DOCUMENTS 10,233,728 B2 * 3/2019 Kristjansson .......... G06Q 10/06
10,275,715 B2 * 4/2019 Laing .................... G01V 13/00

OTHER PUBLICATIONS

Esling, P., & Agon, C. (2012). Time-series data mining. ACM Computing Surveys (CSUR), 45(1), 12 (34 pages).

Fu, T. C. (2011). A review on time series data mining. Engineering Applications of Artificial Intelligence, 24(1), 164-181.

Mueen, A., & Keogh, E. (Jul. 2010). Online discovery and maintenance of time series motifs. In Proceedings of the 16th ACM SIGKDD international conference on Knowledge discovery and data mining (pp. 1089-1098).

Altman and S. Naomi, An introduction to kernel and nearest-neighbor nonparametric regression. The American Statistician 46 (03), 1992 (12 pages).

Coomans and Danny and D.L. Massart, Alternative k-nearest neighbor rules in supervised pattern recognition: Part 1. k-Nearest neighbour classification by using alternative voting rules. Analytica Chimica Acta 136, 1982 (13 pages).

P. Hall and B.U. Park, and R.J. Samworth, Choice of neighbor order in nearest-neighbor classification. The Annals of Statistics 36 (05), 2008, (19 pages).

Holzinger, Andreas. "Interactive machine learning for health informatics: when do we need the human-in-the-loop?." Brain Informatics 3.2 (2016): 119-131.

Holzinger, Andreas, et al. "Towards interactive Machine Learning (iML): applying ant colony algorithms to solve the traveling salesman problem with the human-in-the-loop approach." International Conference on Availability, Reliability, and Security. Springer, Cham, 2016 (17 pages).

Xin, Doris, et al. "Accelerating human-in-the-loop machine learning: challenges and opportunities." Proceedings of the Second Workshop on Data Management for End-To-End Machine Learning. 2018. (4 pages).

* cited by examiner

METHODS AND SYSTEMS FOR FLAGGING EVENTS IN A TIME SERIES AND EVALUATING A DOWNHOLE OPERATION

CROSS REFERENCE

This application claims the benefit of U.S. Provision application No. 62/850,637, entitled "Methods And Systems For Flagging Events In A Time Series And Evaluating A Downhole Operation" filed May 21, 2019, the disclosure of which is hereby incorporated herein by reference.

BACKGROUND

The disclosure relates to a method and system for flagging events in a time series.

When monitoring a system, in particular when drilling or operating a well, a plurality of parameters are measured in order to extract the maximum of information from the wellsite, such as the wellbore or formation and/or wellsite equipments in order to have a better insight of different properties of the formation or equipment, for instance relative to the formation (type of fluid, composition) or to the drilling or operating system, in particular to the integrity of such system, or any maintenance need of the system.

Most of the parameters are measured continuously during a long period of time and their evolution is monitored. The data obtained from such measurements are called time series. Relevant information extraction from time series is often performed by an expert via visual inspection. The experts' eyes are used to recognize the typical patterns on the time series which flag the locations of the information of interest.

The expert is highly accurate in localizing and recognizing the events of interest on a time series but the task of manually selecting the relevant portions of data on which to run the processing procedures is repetitive, time-consuming and low added-value.

SUMMARY

The disclosure relates to a method for flagging at least an event of interest in an unlabeled time series of a parameter relative to a wellsite (including to the well, formation or a wellsite equipment), wherein the time series of the parameter is a signal of the parameter as a function of time. Such method comprises collecting an unlabeled time series of said parameter, extracting at least an unlabeled subsequence of predetermined duration in the time series, and classifying at least one of the unlabeled subsequences into a cluster of a predetermined set using a loss function representative of the set of clusters. The predetermined set and the loss function have been determined based on a database of training subsequences of predetermined duration. Further, the method includes assigning an event of interest to at least one of the unlabeled subsequences, based on the classification and a predetermined relationship between at least one cluster and at least an event of interest.

The disclosure also relates to a method for evaluating a pressure test performed in a borehole formed in a geological formation, comprising collecting an unlabeled pressure time series relative to the formation acquired during the pressure test, and extracting one or more subsequences representative of a buildup phase of the pressure test of predetermined duration from the time series. The method also includes assigning a label representative of the status of the pressure test based on the at least one extracted subsequence, using at least a predictive function. The predictive function has been determined using a dataset of labelled pressure time series. The method includes sending a command to a wellsite operating system based on the assigned label.

The disclosure also relates to a system for evaluating a downhole operation performed in a borehole formed in a geological formation. The system comprises a processing system configured to collect an unlabeled time series relative to the geological formation and extract at least a subsequence of predetermined duration from the time series. The processing system also assigns a label representative of the status of the downhole operation based at least on the extracted subsequence, using at least a predictive function. The predictive function has been determined using a dataset of labeled subsequences of predetermined duration. The processing system is also configured and to send a command to a wellsite operating system based on the assigned label. The processing system may be configured to perform one or more operations of the method as disclosed above.

Such methods and systems enable to automatically and in real-time flag events at the well site and/or given indication on the status of a downhole operation, such as a pressure test, enabling easier decision making, limiting the failure of ongoing operations and the non-productive time and liberating time for the experts to focus on other tasks having with more added value.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
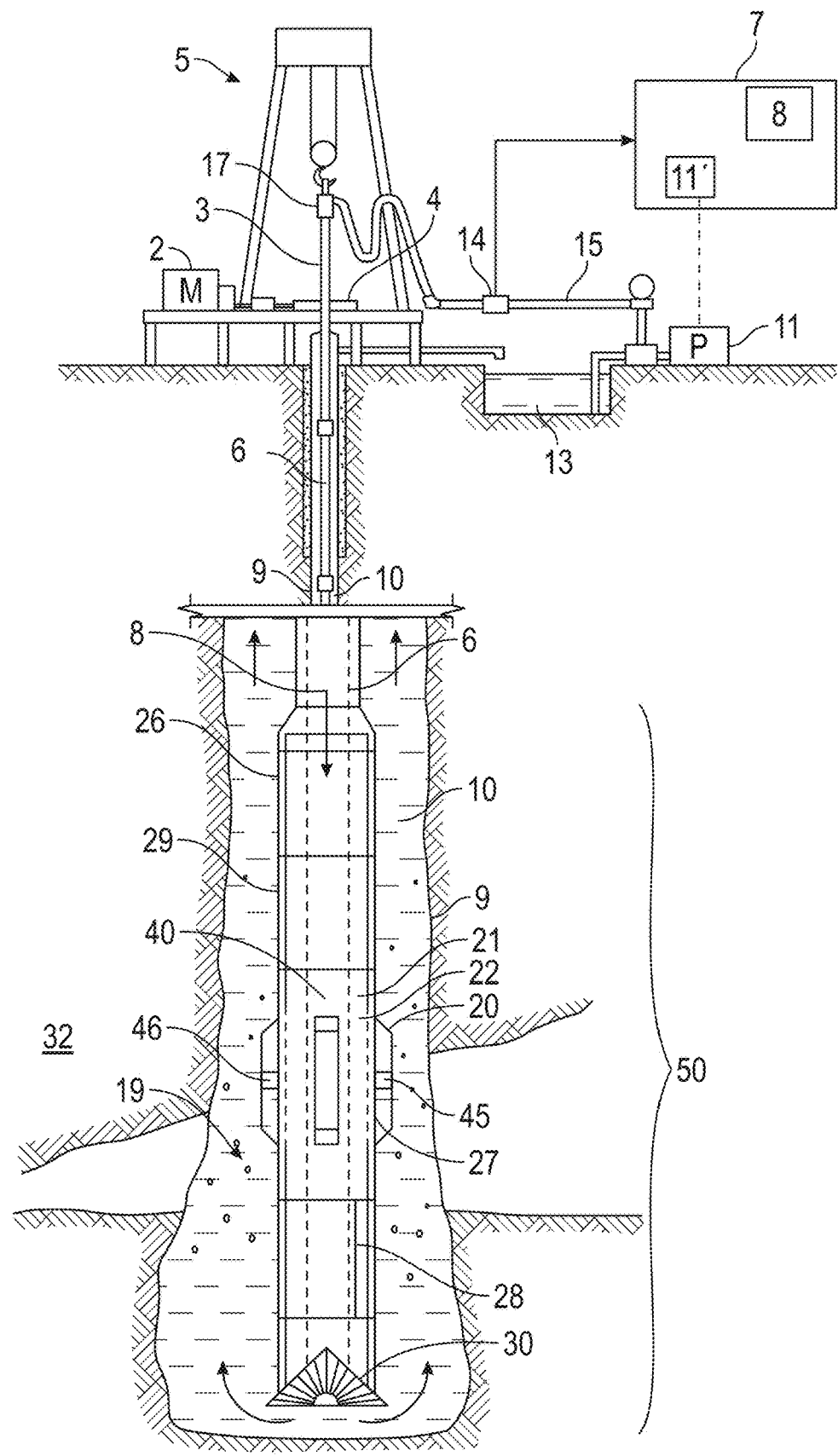
FIG. 1 is a schematic drawing of a system for drilling a wellsite, according to an embodiment of the disclosure.

FIG. 1 discloses an example of installation for operating a wellbore.

FIG. 1 is a schematic view of at least a portion of an example implementation of a rotary drilling rig system 5. Downhole measurements can be conducted by instruments disposed in a drill collar 20. Such measurements may be stored in memory apparatus of the downhole instruments, or may be telemetered to the surface via conventional measuring-while-drilling (MWD) telemetering apparatus and techniques. For that purpose, an MWD tool sub, schematically illustrated as a tool 29, may receive signals from instruments of the collar 20, and may transmit them via a mud path 8 of a drill string 6 for receipt, e.g., ultimately via a pressure sensor 14 in a stand pipe 15 and/or to other surface instrumentation 7.

The drilling rig system 5 may include a motor 2 that may turn a kelly 3 through the use of a rotary table 4. The drill string 6 may include sections of drill pipe connected end-to-end to the kelly 3 and may be turned thereby. For example, a plurality of drill collars and/or tools 20, 26, 28, and 29 may be attached to the drilling string 6. Such collars and tools may collectively form a bottom hole assembly (BHA) 50 extending from the drill string 6 to a drilling bit 30.

As the drill string 6 and the BHA 50 turn, the drill bit 30 can bore a wellbore 9. An annulus 10 is thus defined between the outside of the drill string 6 (including the BHA 50) and the wellbore 9 through one or more subterranean geological formations 32.

A pump 11 may pump drilling fluid (drilling "mud") from a source, e.g., from a mud pit 13, via a stand pipe 15, a revolving injector head 17, and the mud path 8 of the kelly 3 and the drill string 6 to the drill bit 30. The mud may lubricate the drill bit 30 and may carry wellbore cuttings upward to the surface via the annulus 10. If desired, the mud may be returned, e.g., to the mud pit 13 or to an appropriate mud regeneration site, where it may be separated from cuttings 19 and the like, degassed, and returned for application again to the drill string 6.

The tool (collar) 20 may be any type of downhole tool taking measurement, such as an ultrasonic tool, an electromagnetic or resistivity tool, a sampling tool. For example, the ultrasonic tool 21 may include at least one or more sensors 45, 46, e.g., such as for measuring characteristics of the wellbore 9 and/or fluid, including pressure, standoff, composition, etc. therein during drilling operations. Such measurements may be conducted while the wellbore 9 is being drilled and/or with the drill string 6 and the BHA 50 in the wellbore 9 while the drill bit 30, the BHA 50, and the drill string 6 are not rotating. Such measurements may be conducted while the drill string 6, the BHA 50, and the drill bit 30 are being tripped to and from the bottom of the wellbore 9. The measurements (or data based at least partially thereon) may be transmitted to the surface via the MWD telemetry tool 29 and the internal mud passage 8 of the drill string 6 (or the annulus 10), or they may be recorded and stored downhole and for retrieval at the surface after the drill string 6 and BHA 50 have been removed from the wellbore 9.

The sensors 45, 46 may be mounted on stabilizer fins 27 of the downhole tool 20, as depicted in FIG. 1, or may be mounted in a cylindrical wall 23 of the downhole tool 20.

An electronics module 22 may contain electronic circuits, microprocessors, memories, and/or the like, operable to control, and/or to receive, process, and/or store data from the sensors 45, 46, which may be mounted on a sleeve, an inner tube, and/or other section secured around or within the collar of the ultrasonic tool 21. The section and other components of the BHA 50 may include a path 40 by which drilling mud may pass through the interior passage 8 of the drill string 6 to the drill bit 30.

A portion of the drilling rig system 5, such as surface instrumentation 7, may include other sensors for measurement parameters at the surface, such as flow, pressure, etc. and verify that the system works properly. As an example, a sensor 11' may be connected to the pump 11 to count the number of strokes of the pump but many other sensors may be present at the well site. The surface instrumentation 7 may also include data processing system 8 that can encompass one or more, or portions thereof, of the following: control devices and electronics in one or more modules of the BHA 50 (such as a downhole controller), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. For example, such data processing system may include processor capability for collecting data obtained from the sensors at the surface or downhole. Methods and/or processes within the scope of the present disclosure may be implemented by one or more computer programs that run in a processor located, e.g., in one or more modules of the BHA 50 and/or surface equipment of the drilling rig system 5. Such programs may utilize data received from the BHA 50 via mud-pulse telemetry and/or other telemetry means, and/or may transmit control signals to operative elements of the BHA 50. The programs may be stored on a tangible, non-transitory, computer-usable storage medium associated with the one or more processors of the BHA 50 and/or surface equipment, such as surface instrumentation 7, of the drilling rig system 5, or may be stored on an external, tangible, non-transitory, computer-usable storage medium electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
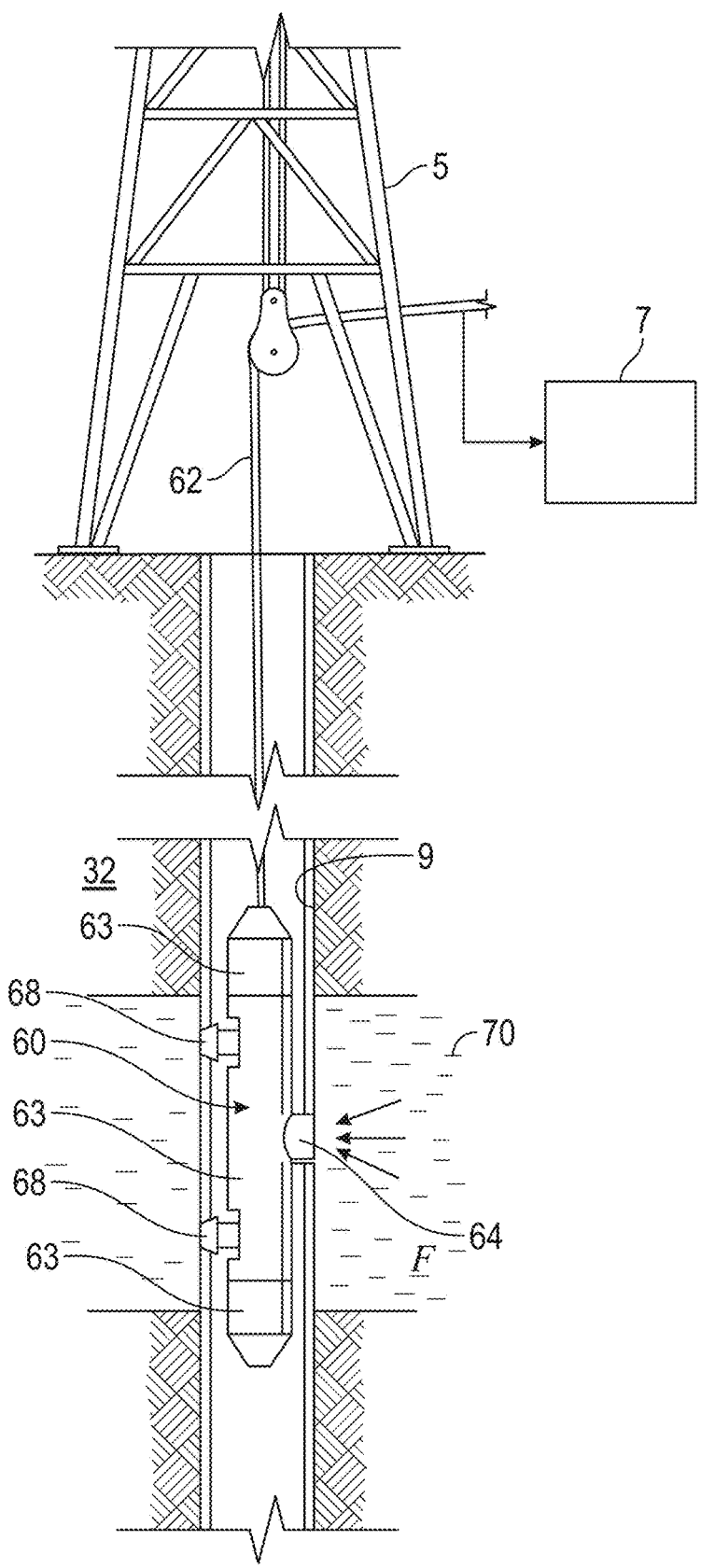
FIG. 2 is a schematic drawing of a system for performing another operation at the wellsite, i.e. a pre-test

FIG. 2 describes another system for operating a wellbore, this time including a wireline operation. The system of FIG. 2 describes in particular a system including a pre-test tool.

The system of FIG. 2 includes a downhole tool 60 lowered into the wellbore via a wireline cable 62. The downhole tool 60 is deployable into wellbore 9 and suspended therein with a conventional wireline 62, or conductor or conventional tubing or coiled tubing, below the rig 5. The illustrated tool 60 is provided with various modules and/or components 63 including, but not limited to, a probe 64, a packer or other formation testing tool inlets including a flowline for establishing fluid communication with the formation and drawing the fluid 70 contained in the formation into the downhole tool as shown by the arrows. The pretest tool also comprises pressure sensors (not shown) measuring the pressure in particular in the probe (ie flowline). Backup pistons 68 may be provided to further thrust the downhole tool against the wellbore wall and assist the probe in engaging the wellbore wall. Pretest tool draws fluid from the formation during a first drawdown phase and then stop drawing fluid during a buildup phase as will be explained in more details below. For a given well and given depth, the tool records a time series of pressure, in order to determine the formation pressure.

The components of the wireline downhole tool may be modular as shown on FIG. 2 or may be contained in one tool. The wireline tool may also contain an electronics module as described hereinabove in FIG. 1 as well as surface instrumentation 7 comprising at least data processing system and possibly additional sensors as described below. The wireline tool communicates with the surface instrumentation via the wireline cable.

Of course, the system for operating the wellbore is not limited to the two examples above. Such may comprise any downhole and/or surface sensors for measuring parameters in time, regardless of where at the wellsite the sensors are situated and how they are conveyed. For example, the sensors may be disposed on downhole valves, measuring pressure or flow, on completion strings, or on a surface or downhole testing assembly.

A method for flagging or determining the occurrence of events of interest on time series, without or with limited involvement of an expert, is disclosed in the following. The method includes two essential building blocks that will be detailed below, i.e. the constitution of a dictionary of typical events of interest from the set of examples, and, given one or several time series to analyze, search and return potential occurrences of events from the dictionary.

With the events of interest flagged along the time series to analyze, one can now automatically apply processing and/or inference procedures to the corresponding portions of data. The presence/absence of certain events on a time series, the number of occurrences of these events or the order in which they appear on a time series can be of interest in itself depending on the application. The current disclosure also describes a method of operation of the wellbore based on such determination of occurrence of events. An example relative to the pre-test of the formation will be discussed in more details, but the wellbore could be operated in different aspects thanks to the below method.

Figure 3:
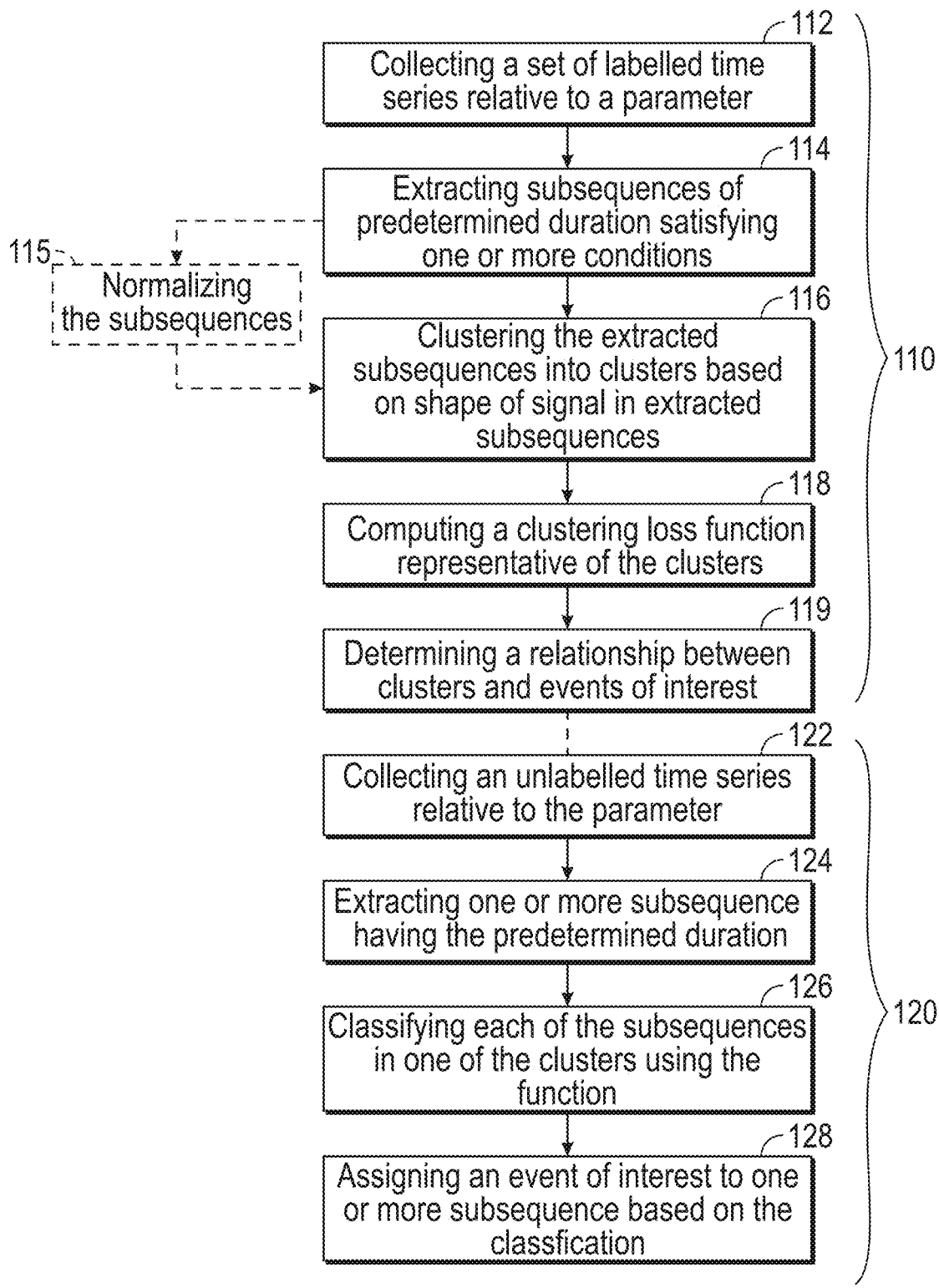
FIG. 3 is a flowchart of a method according to an embodiment of the disclosure.
Figure 4:
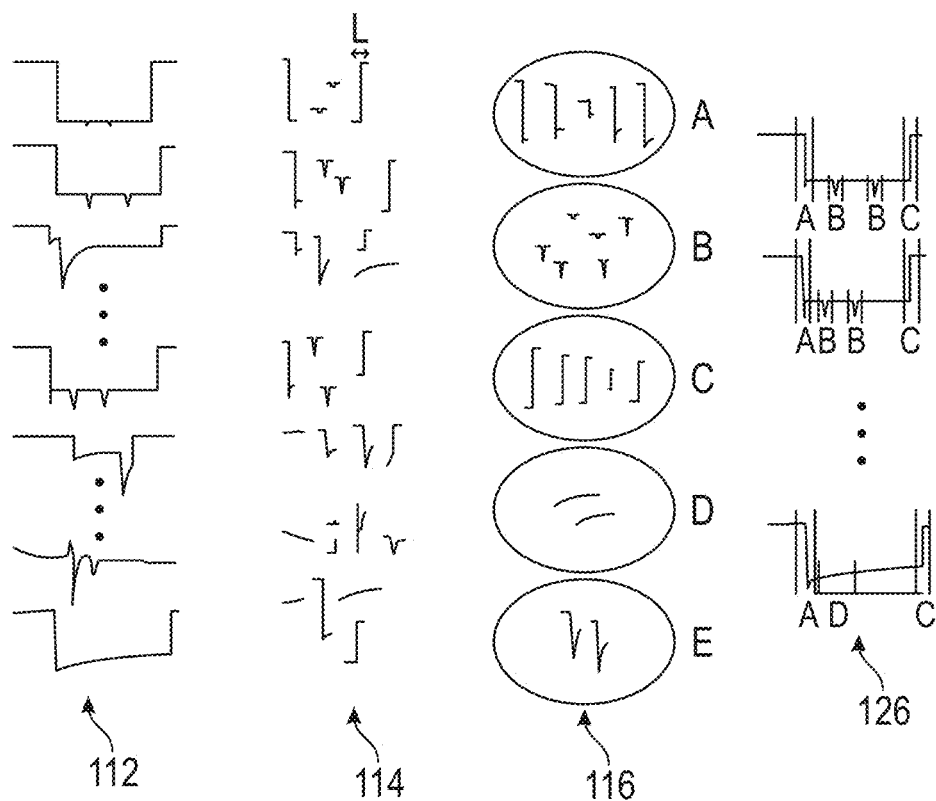
FIG. 4 is a visual representation of different operation of the method of FIG. 3.

With reference to FIG. 3 and FIG. 4, the method 100 for localizing event in a time series comprises a first method 110 of building a dictionary of events, also designated below as training operation, and a second method 120 of localizing a particular even in a given signal, also designated below as an inference operation.

The training operation 110 is generally performed remotely from the well site, taking into account a plurality of time series relative to a given parameter (for instance, pressure as a function of time taken during a pre-test or at a pressure sensor situated at a particular location at the wellsite), well before the well operation takes place. Of course, the first operation may be refined/updated continuously based on new sets of time series for the same parameter. The inference operation 120 is performed during the well operation, in real time, preferably at the well site, preferably downhole in order to maximize the efficiency of the operation. However, it is noted that the inference operation might be also performed remotely from the wellsite and/or well after the well operation has taken place in certain circumstances. In other words, the training and inference are not necessarily performed one after another at the same time, or the same day.

Regarding the training 110, the method comprises collecting (block 112) as an input a set of labelled time series relative to the parameter. The "labelled time series" are time series in which corresponding events of interests have been flagged (i.e. identified and located in time). As an alternative, the time series are not labelled and will be labelled during the training by the user, for instance as explained later. The set of time series may be data collected during previous well operations during which the same parameter (for example pressure during a pre-test operation) has been measured or modelled time series modelling the behavior of the system (for example pre-test system) depending on different events.

Once the input time series have been collected, the method extracts (block 114) all subsequences of predetermined duration L of the time series which satisfy one or more conditions. The output of this operation is a collection of subsequences of duration (or length) L extracted from the input time series data. The set of conditions may be defined by the system (for instance, automatically discard subsequences in which no significant variations occur based on minima/maxima comparison) or the user. The set of conditions may include no condition. In the latter case, the extraction consists in passing a rolling window on the whole duration of the set of input time series and taking each rolling window as subsequence, which is not optimal in terms of computation time and power but is nevertheless possible.

The user-defined set of conditions generally reflects the prior knowledge about the events that the expert is able/willing to incorporate in the procedure. Examples of specific conditions may include extract non-overlapping subsequences, subsequences of mean within a certain range, subsequences of standard deviation or slope higher/smaller than a certain threshold, etc. The less restrictive the conditions, the more subsequences irrelevant to the expert's task will be processed, and the more computationally expensive the overall procedure will be. The more restrictive the conditions, the less irrelevant subsequences will be processed and the less expensive the procedure will be. Typically, it is difficult to find a necessary and sufficient set of conditions to extract exactly and robustly only the subsequences of interest, but a rough necessary condition can be enough to prune most of the irrelevant information and significantly speed up the process. The role of this set of conditions is thus to discard grossly irrelevant information from the beginning in favor of speed and conciseness.

The length L may be chosen by the user, or optimized by the system based on several extractions on a limited set of subsequences extraction (the length might be chosen so that it is likely to include at least a predetermined number of local extrema for instance). The system may also extract subsequences of several lengths, such as $L_1$ and $L_2$ and process in parallel or one after another both extracted sets of subsequences in the following in order to determine what is the best dictionary.

The method then includes clustering (block 116) the extracted subsequences based on the shape of the signal in each subsequence. In other words, as can be seen on FIG. 4, the subsequences having signals of similar shapes are grouped in the same cluster (on FIG. 4, A to E). The clustering may be performed based on a distance metric and is an unsupervised clustering method. The distance metric may for instance be Euclidean distance, $L^1$ distance, dynamic time warping distance (DTW) or any other distance that could be found appropriate. The clustering can be performed using standard algorithms (such as K-means, hierarchical agglomerative/divisive clustering, DBSCAN), and/or manually by the expert. Being expert-driven, the latter yields better quality, more task-relevant clusters at the expense of speed. As part of the clustering, the subsequences may be transformed into a vector representative of the time series, of the variations of the curve. The clustering operation may use a shapelet algorithm.

The method may include an optional intermediary normalization operation (block 115) that consists in removing elements that are not of interest for the clustering but may affect the clustering (for instance, in which portion of a subsequence a certain shape is witnessed or the amplitude of the shape). The normalization may comprise centering, scale-normalization, etc.

At the end of the clustering operation, the extracted subsequences are grouped into clusters. Each cluster typically represents a certain type of event, and the subsequences assigned to this cluster are examples of shapes that the event can take on a time series.

Optionally, the clusters may be modified by the expert, manually and/or programmatically: clusters can be removed, added, merged, split, or the subsequences they contain can be removed, added, transformed. This is included in the clustering operation.

The method then includes computing a function representative of the cluster (block 118), hereinafter a clustering loss function. This loss function (or cost function) takes as an input a subsequence and outputs a vector of matching qualities between the subsequence and each of the clusters, for instance, the vector of distances between the (possibly transformed) subsequence and the closest/furthest/average subsequence in each cluster (with respect to one or more distances, e.g., Euclidean, $L^1$, etc.), or it can output a vector of model-based or empirical likelihoods of belonging to each cluster. The loss function can be augmented by a common and/or cluster-specific penalization terms (e.g., cost of scale-normalizing the subsequence, cost of centering or other).

Once the loss function has been computed, the dictionary that will help to the analysis of the time series is completed and the training 110 ends. Such dictionary comprises the clusters themselves as well as the loss function.

Figure 5:
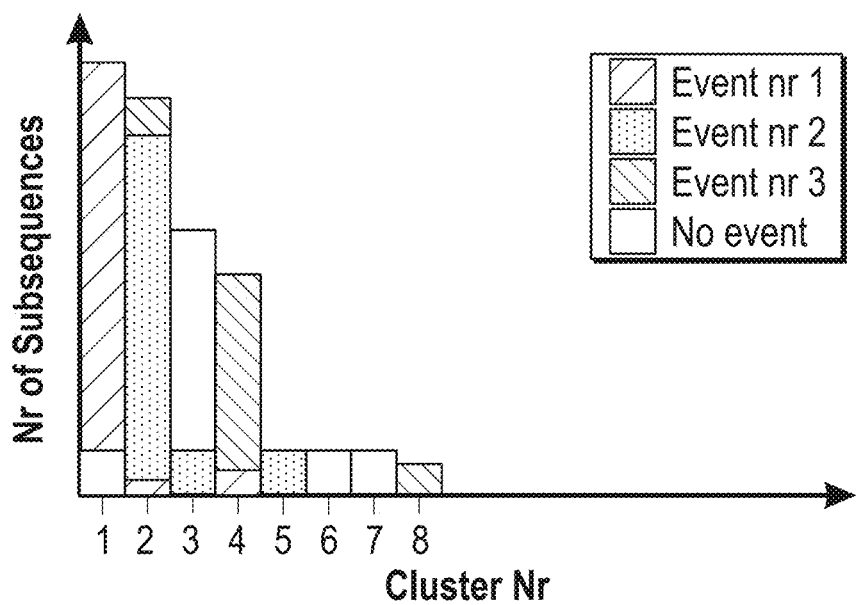
FIG. 5 is a plot showing an example of distribution of event in clusters, relevant for an operation of the method of FIG. 3.

The method then comprises determining a relationship between at least a cluster and at least an event of interest (block 119). In this embodiment, the operation consists in associating to one or more clusters the event of interest based on the proportion of subsequences flagged as containing the event and classified in these one or more clusters. For instance, as shown on FIG. 5 representing the number of subsequences per cluster and associated flagged event, event number 1 is associated with cluster 1, event number 2 with cluster 2 and 5, while event number 3 is associated with clusters 4 and 8 and it is considered that no event occurs during the subsequence if subsequence is classified in cluster 3, 6 or 7. Such association of an event and a cluster is a predictive function in its simplest form. Training operations will be described in the following in relationship with particular embodiments that might be applicable to a more generic context such as the one described herein (assigning an event of interest to a subsequence of a time series representative of a parameter).

As an alternative, the training is performed based on the unlabeled time series as explained above. In this case, the user associates events to each cluster based on his knowledge of the well equipment or well behavior and the influence of the event on the signal shape.

When a time series for the same parameter is available, for instance in real-time at the well site the inference 120 starts. As indicated above, this can be several hours, days or weeks after the training operation 110. Of course, the operation 110 may be performed only once while multiple inference operations 120, for instance for different time series coming from different wells or different measurements at different times in the well may be performed depending on the user's need. The training operation may also be refined with new data acquired.

The inference operation includes collecting a time series of the measured parameter, that will be scanned for the occurrence of events from the dictionary (block 122). One or more subsequences of predetermined duration L are extracted from the time series (block 124). In an embodiment, the scanning consists in passing a rolling window of predetermined length L and to evaluate the loss function at each of the corresponding subsequence. Optionally, not all windows need to be scanned and evaluated by the loss function (which can be computationally expensive if the time series is long and the dictionary is information-rich): the extraction operations may comprise a pre-selection of windows based on user predefined conditions. Such windows can for instance be directly assigned a high loss over all clusters if they do not meet a set of user-defined, which can be the same as in the training operation or other conditions. This preselection operation allows the expert to incorporate prior knowledge in the procedure and speed up the process, limiting computation power and time necessary for the evaluation.

The previous comprises evaluating the clustering loss function at each extracted subsequence to evaluate the matching between each extracted subsequence and each cluster. The matchings may be presented together for all subsequences. In this case, the output of this operation can be represented as a matrix with window (i.e. subsequences) indexes in columns, dictionary clusters in rows, and where each element is the matching loss between the current window's subsequence and a given cluster. The matching loss is an indicator of the differences of one window subsequence with the type of subsequences found in the cluster and the higher its value, the more different the subsequence is from the cluster subsequences. This matrix will be called the loss matrix in the following. Of course, the loss matrix could have the window indexes in rows and clusters in columns in another embodiment. Further, the function could be chosen so that the likelihood to belong to each cluster is evaluated and the higher the likelihood matrix value would be the more similar to the cluster the signal will be.

The method then includes classifying at least a subsequence in one of the clusters (block 126) based on the loss matrix. This is done based on a extremum determination, ie determining the lower value of the loss function for one particular subsequence and choosing the associated cluster. The classification may include optionally filtering the loss matrix to retain only the local best match between the window and some cluster of the dictionary. For instance, for each row of the loss matrix, local minima over the columns can be detected using, e.g., a rolling window approach, and non-minimum entries can be assigned high loss values. For instance again, for two or more overlapping neighbouring subsequences, one can retain only the cluster with lowest loss value (all clusters confounded) not only for one subsequence, but for all neighbouring subsequences, and discard the others.

This operation outputs time locations of windows on the time series and associated best matching cluster of the dictionary. Variants of this step are possible such as, instead of returning only the best matching cluster for a given subsequence/group of overlapping subsequences, returning the first several bests.

The method then includes assigning an event of interest to one or more subsequences based on the classification (block 128). In this embodiment, this is directly linked to the clustering which the subsequence is classified. For instance, referring to FIG. 5, if one sequence is classified in cluster 1, it will be considered that event number 1 occurred during this subsequence.

Several additional operations may be conducted: for instance, if a series of event in a particular order are searched for, once the events are determined an additional search for detecting the series of event may be conducted. An alert may also be raised when one or a series of events is detected. One or more actions at the wellsite may also be triggered, such as one or more commands to a downhole tool or another element of the wellsite operating system.

As mentioned earlier such method for event determination may be applied to any signal measured in time. This algorithm has been applied in particular for pre-test operations in a wellbore.

Figure 6:
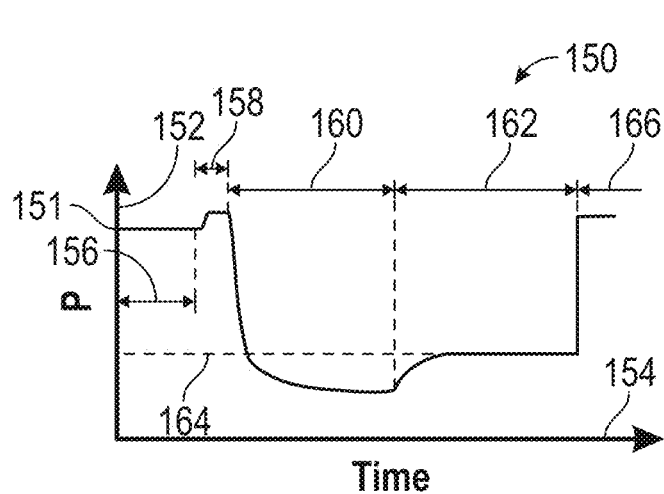
FIG. 6 is a typical pressure time series taken from pre-test

The pre-test operation includes, as mentioned above a drawdown and a build up phase and has a well-known profile as represented on FIG. 6. The profile 150 shows the pressure 152 as a function of time 154 during the pretest, i.e. a pressure time series. Such profile will be quickly explained below. In a first phase 156 the flowline of the probe is connected to the formation, the read pressure being the pressure 151 of the wellbore fluid (such as mud in the wellbore). Then, the portion of the wellbore in which the measurement is taken is isolated with packer, leading to a slight increase in pressure in a phase 158. Then the drawdown phase 160, during which formation fluid is drawn into the tool begins. The pressure decreases due to flowline expansion and then stabilizes. Once the pressure is stabilized, the tool stops drawing the fluid and the buildup phase 162 begins. The pressure slowly rises and finally stabilizes at formation pressure at value 164. Several pretests may occur sequentially before the retraction of the probe. When the probe is retracted from the formation, the pressure gauge reads once again the pressure of the wellbore fluid. This is represented in phase 166.

Figure 7:
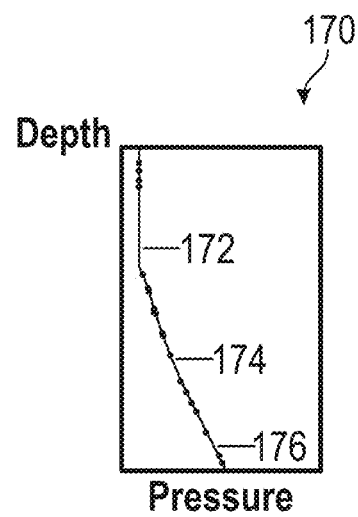
FIG. 7 is an example of a plot of pressure versus depth in order to determine the pressure profile and fluid type in the reservoir.

If the pre-test is done properly, the pressure 164 measured at the end of the buildup phase should be a reliable measure of the formation pressure at the tool's current depth. In that case, this measure can be added to a pressure vs depth plot 170 as shown on FIG. 7. Other pretest acquisitions are conducted at different depths, and each provide a measure of the formation pressure. Pressure gradients 172-176 can be deduced from the plot 170, which indicate the locations of oil, gas, water in a given well depending on the slope of the plot that depends of density of the material in the reservoir. Here, for instance, in zone 172, the reservoir comprises gas, in zone 174, oil and in zone 176, water. Pressure vs depth measurements for different wells allow to infer, e.g., the size and spatial disposition of the reservoir and the connectedness of different sections of the reservoir.

Figure 8:
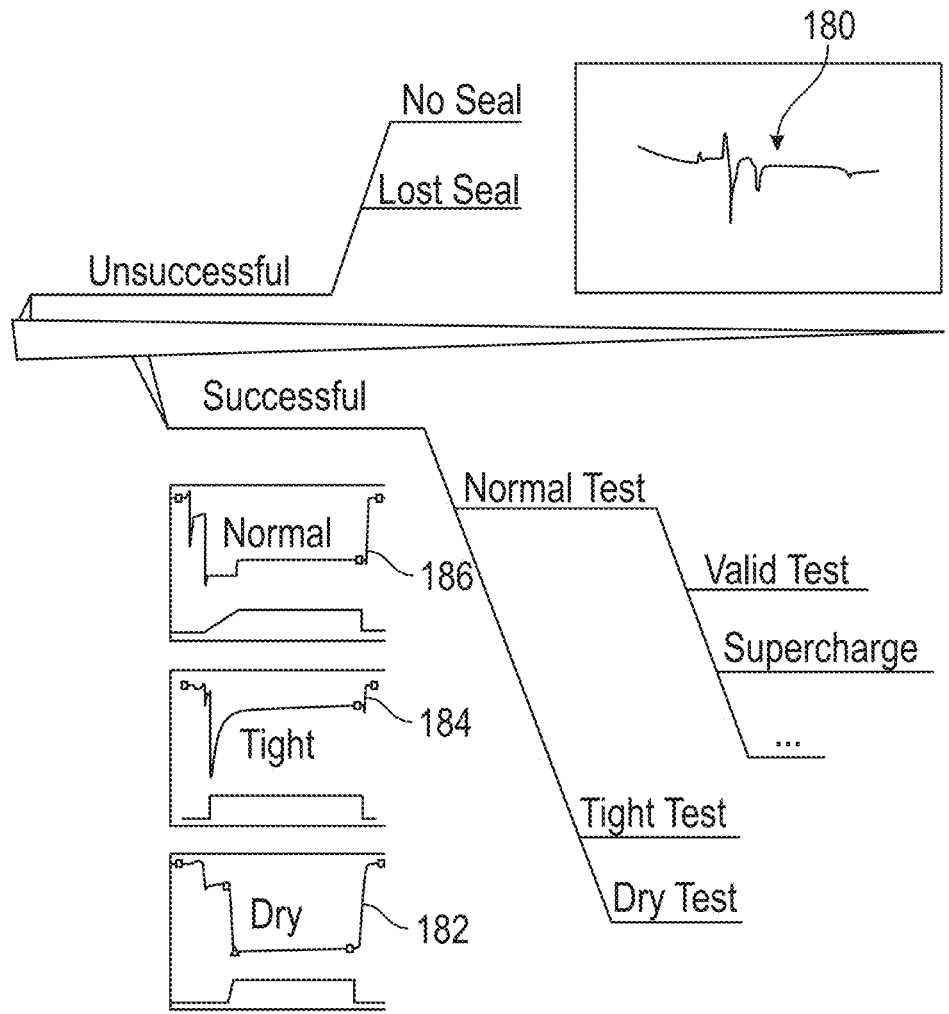
FIG. 8 is a schematic drawing of different types of pretests

However, in some instances of the pretest, the formation pressure cannot be deduced from the measured pressure. FIG. 8 presents all of the different profiles of pressure tests. The different cases are listed below:

No seal or lost seal: the seal packer doesn't form a good isolation around the probe, thus mud enters the tool, and probe reads mud pressure right after connection of the probe with the formation or after a first pressure decrease. A typical pressure time series for such profile is shown at 180, in which we can see that the pressure does not permanently drop during the drawdown phase, Dry pretest: no formation fluid enters the tool, pressure does not rise after drawdown stops. A typical pressure time series for such case is represented at 182

Tight pretest: little fluid enters the tool, pressure rises very slowly after drawdown stops, and does not stabilize before a very long time. A typical pressure time series for such case is represented at 184

Normal pretest: the tool is quickly filled with fluid, pressure rises and stabilizes quickly after drawdown stops. A typical pressure time series for such case is represented at 186, similar to the profile 150 of FIG. 6

Regarding the normal pretest, it is divided in two subcategories of pre-test: the valid pretest, measuring the formation pressure at the end of the buildup phase and the supercharged pretest, for which the pressure can stabilize above formation pressure. To distinguish a valid pretest from a supercharged, one needs to perform several pretests at the same depth. In case of valid pretests, pressure should stabilize at the same level after each attempt. In case of supercharged, pressure stabilizes at lower and lower levels after each attempt—eventually, stabilization levels stop going down after several pretests when getting close to formation pressure.

The method of determining an event of interest is being used in this particular example in order to detect with high confidence as soon as possible if a pre-test is unsuccessful because of no seal or lost seal or if it will not be able to measure the fluid formation because it is a dry or a tight pretest. The method may be used at the wellsite and in real-time and may be able to infer on the operation of the tool. The method will be disclosed here in more details regarding the differentiation of dry pre-test, tight pre-test and normal pre-test, but such method could also be used to differentiate successful from unsuccessful pre-tests.

The method 200 of detecting invalid pretest will be explained in more details below using references to the event detection method disclosed hereinabove and is represented on FIGS. 9A & 9B. As mentioned above, such methods are described in relationship with a pressure test but might be applicable to any other event to detect and to time series relative to another parameter.

It comprises a preparation operation (block 201) and a determination operation (block 203), that may not be performed at the same time as the preparation operation, as explained hereinabove with respect to the training and inference operation of the event determination method.

First, the preparation operation 201 comprises collecting (block 202) a database of labeled pretest data, and to perform the subsequence extraction 114 according to one or more conditions, as described in relationship with the training operation 110. The labels may for instance include 'dry', and/or 'tight' and/or 'normal' to designate the nature of the pretest. Generally, the method includes at least two labels.

Figure 9A:
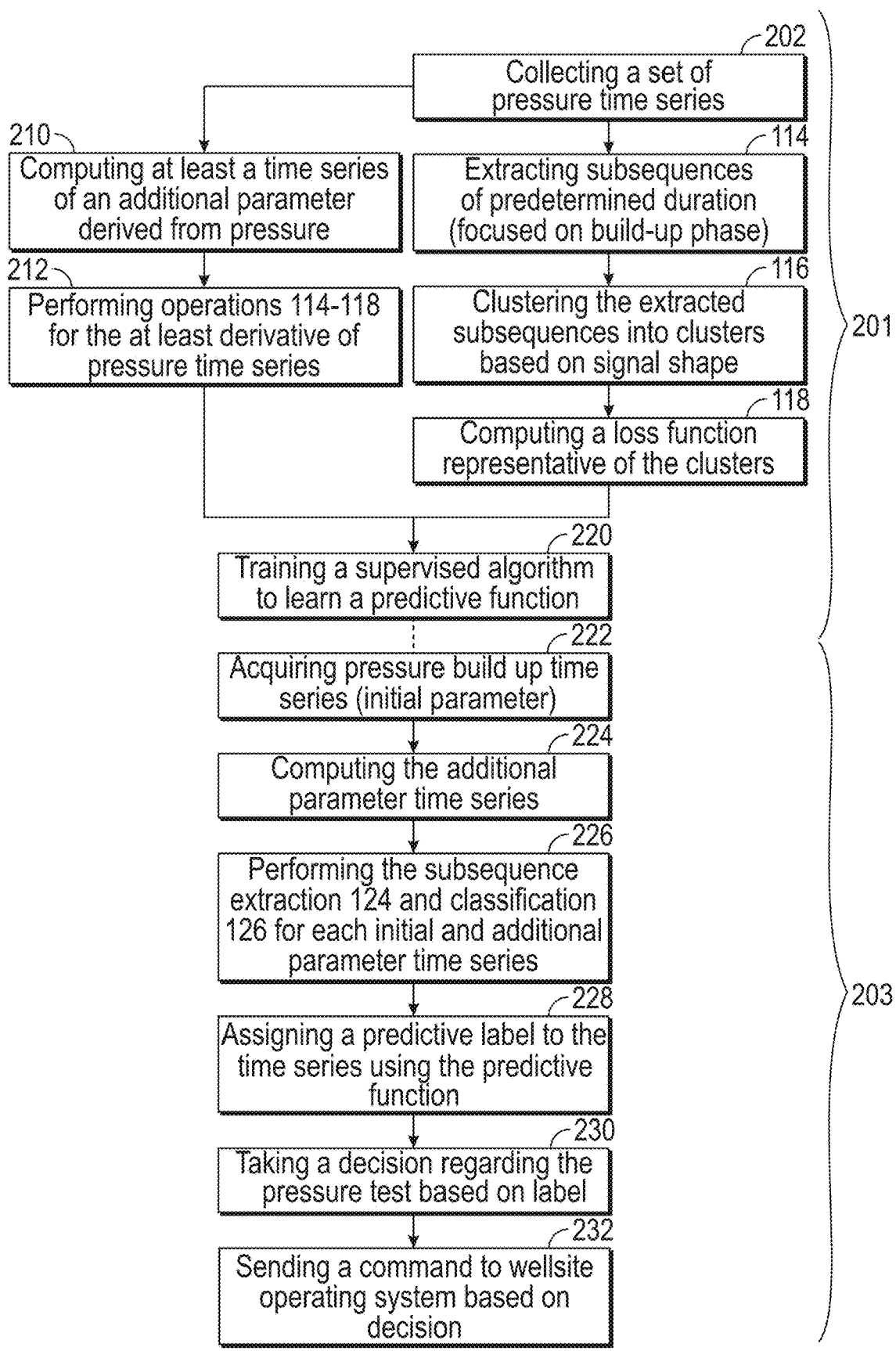
FIG. 9A is a flowchart of an embodiment of a method according to the disclosure.
Figure 9B:
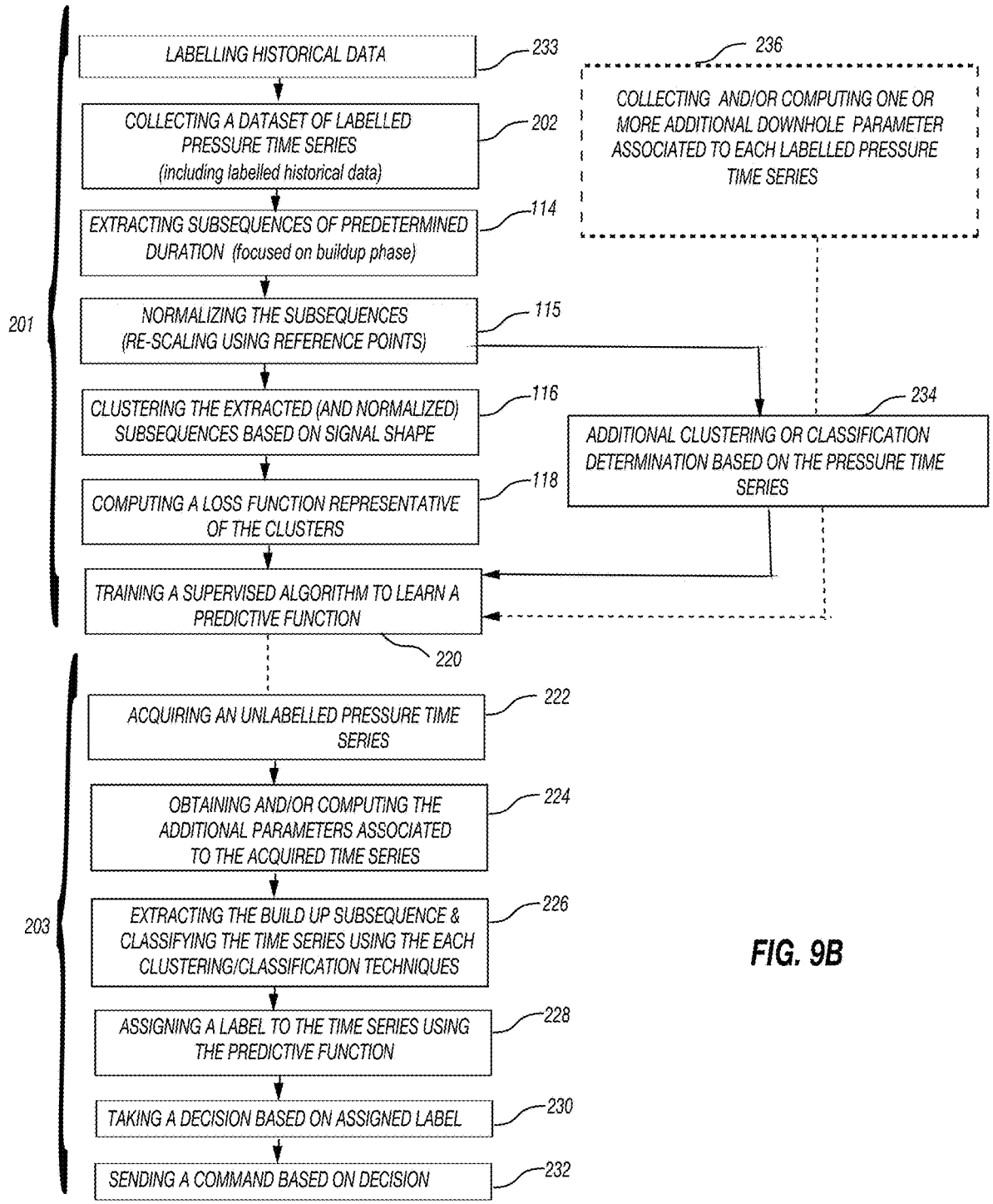
FIG. 9B is a flowchart of another embodiment of a method according to the disclosure

In the embodiment represented FIG. 9B, when no labelled data are available, the user may label historical data that will be inputted into the model (block 233). An interface may be created to enable such labelling. As part of the labelling operation, the user can select the historical data to label data that has been taken in a similar environment as the current environment (such as same location, same type of properties of the geological formation) in order to label data taken in a similar context which may lead to a model trained with better accuracy. Indeed, a selection of the training data used to train the model makes sense in view of the geological properties of the formation, such as the density, permeability, viscosity, etc. of a reservoir. For instance, in low permeability, high viscosity reservoir, tight test happens more frequently than in high permeability, low viscosity reservoir. Therefore, during the pressure test in high viscosity reservoir, the stabilization of pressure takes longer time on average, in comparison with those low viscosity reservoirs. In this case, field engineers tend to wait relatively longer for the stabilization of pressure. Therefore, a same pressure response might be regarded as "normal test" in high permeability reservoir, while "tight test" in low permeability reservoir. In other word, there is no universal cutoff between a tight or normal test and selecting a different training dataset per job, user, location, or basin or type of job, more accurate results may be reached. Such selection is described herein in relationship with FIG. 9B but could be applied to any of the methods in the current disclosure.

In another embodiment, data that are collected are pre-labelled and, in the collecting operation 202, the user may validate the attributed labels and/or select a portion of the pre-labelled data that correspond to one or more conditions, ie data labelled in a particular location or type of formation or by a particular user.

In another embodiment, the collection operation includes a mixing pre-labelled data and newly acquired data labelled by the user and, if appropriate, selected in view of a particular context.

In such embodiment, the training operation may be performed before each job and/or each time the user considers it is necessary. The training that will be described in the following may be performed automatically, ie all of the training operations described below are applied on the training dataset selected by the user when the user triggers the operation, for instance by clicking in a button in the dedicated interface.

In the example taken below, to determine if the pretest is normal, tight or dry, the events of interest to focus on are the build-ups and the user can select as part of the extracting operation 113 only the portion of the time series where a build up occurs. Alternatively, the condition could be selected automatically taking into account other measured parameters, such as pump motor speed, that would provide information about their locations on the time series.

In such a method, given a user-provided window length L, one can extract all subsequences of length L following a stopping time of the pump motor, as these can be considered proxies of start times of build-ups (for instance, 60 seconds). The length L here corresponds to the duration since the beginning of the build-up. Typically, one would like to be able to infer the pretest type with high confidence for L as small as possible. One could also think of using the method for "L1=30 s", "L2=45 s", "L3=60 s", etc. to select as a duration after training a duration that is the shortest and provides results with an acceptable confidence (for instance, 90%) or update inference after different waiting time.

The preparation 201 may also include clustering the extracted subsequences 116 and computing a clustering loss function representative of the clusters 118 as explained in relationship with the training 110. In an embodiment, so that the user can easily select the appropriate training dataset, the parameters of the clustering model have been determined beforehand (for instance, distance metrics and clustering algorithm used). In another embodiment, the preparation may include such determination of the clustering model parameters.

As an output of operation 118, the user obtains a dictionary, consisting of clusters and associated loss function.

Figure 11:
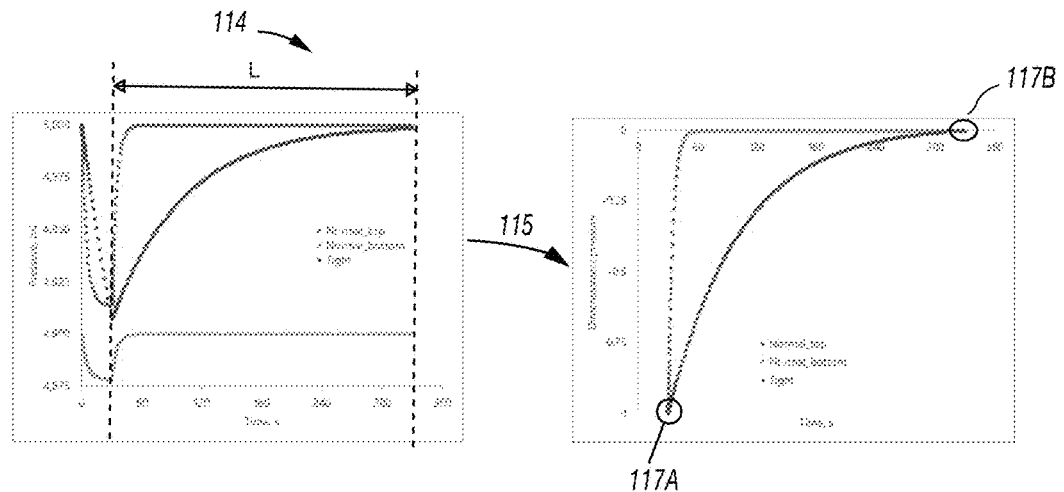
FIG. 11 is a plot showing an operation of the method of FIG. 9B

The method may also comprise, before clustering, normalizing the subsequences in relationship with operation 115 of the training operation as shown on FIG. 9B. In a particular embodiment, the normalization may include re-scaling the subsequence so that all subsequences are dimensionless. Such normalization may include using two points as reference points and applying a transformation to the subsequence so that the references points have the same values for all the subsequence tests. For subsequences corresponding to build-ups, the reference points may be the first point and the last point of the sequence. FIG. 11 shows an example of sequences from which subsequences of duration L are extracted 114 and re-scaled 115 using the first and last point 117A, 117B as reference points. The values that are attributed to the reference points here are respectively −1 and 0 but any other value could be attributed to the reference points as part of this normalization.

The clustering operation may include providing a visualization of the distribution of event labels across the clusters to help the expert check the coherence of labels attributed to a database of pretests, identify suspicious labelling (clusters of similar-shaped build-ups containing mixed labels are typically suspicious) or modify the obtained clusters. The clusters and/or labels may be refined by the expert in order to maximize the quality of the training database.

In one embodiment, the method associates each of the cluster to one event of interest as explained in relationship with method 100 (this embodiment not being represented on FIG. 9A or 9B). In this embodiment of the method, the shape of build-ups is analyzed as explained in relationship with block 112 based on the dictionary.

In a second embodiment represented on FIG. 9A, the method may additionally include building one or more additional dictionary based on one or more other parameters relative to the time series and relevant to pressure build-ups, in order to maximize the accuracy of the method.

For instance, for the pre-test, experts typically attribute a label to a pretest by taking into account a combination of several features, such as, but not limited to:

the shape of the pressure build-up (as described above),
the shape of a derivative of the build-up with respect to at least a parameter relative to time, such as the shape of the derivative of the build-up with respect to spherical time, and/or the shape of the derivative of the build-up with respect to radial time, wherein the radial and spherical time are parameter relative to time and well-known for well test experts.

the mobility (which is defined as the formation permeability divided by the fluid viscosity, and may be estimated by, e.g., evaluating the area between the last build-up pressure and the drawdown—build-up pressure curve)

Some of the parameters mentioned above are represented as time series, such as the derivative mentioned above.

In particular, the method may comprise computing at least an additional parameter time series based on the pressure time series, here a derivative of the pressure as a function of time, such as spherical and/or radial time (block 210). When each derivative of each time series has been obtained, the method may include perform the operations 114-118 (block 212) on the database of derivative as a function of spherical time, respectively radial time and therefore obtaining a second dictionary and a third dictionary respectively for derivative as a function of spherical time and radial time. As explained above in relationship with the first dictionary, the building of the dictionary may be based only on relevant portions of the particular time series. As further explained above in relationship with the first dictionary, the dictionary may be refined by the user based on a visualization interface.

In summary, the operations disclosed above provide three dictionaries: a first dictionary of typical build-ups, a second dictionary of typical spherical derivatives, a third dictionary of typical radial derivatives, each comprising clusters and a loss function allowing to evaluate matching qualities between new build-ups/derivatives and the respective clusters. Plus, it provides for each pretest subsequence in the database, which cluster its pressure build-up belongs to, which cluster its spherical derivative belongs to, which cluster its radial derivative belongs to. More generally, subsequence located at the same instant in time are analyzed together. The method is described here with three specific parameters but other parameters relevant to pretest could be used and selected as well instead of or in additional to one or more of the parameters herein described.

Figure 13:
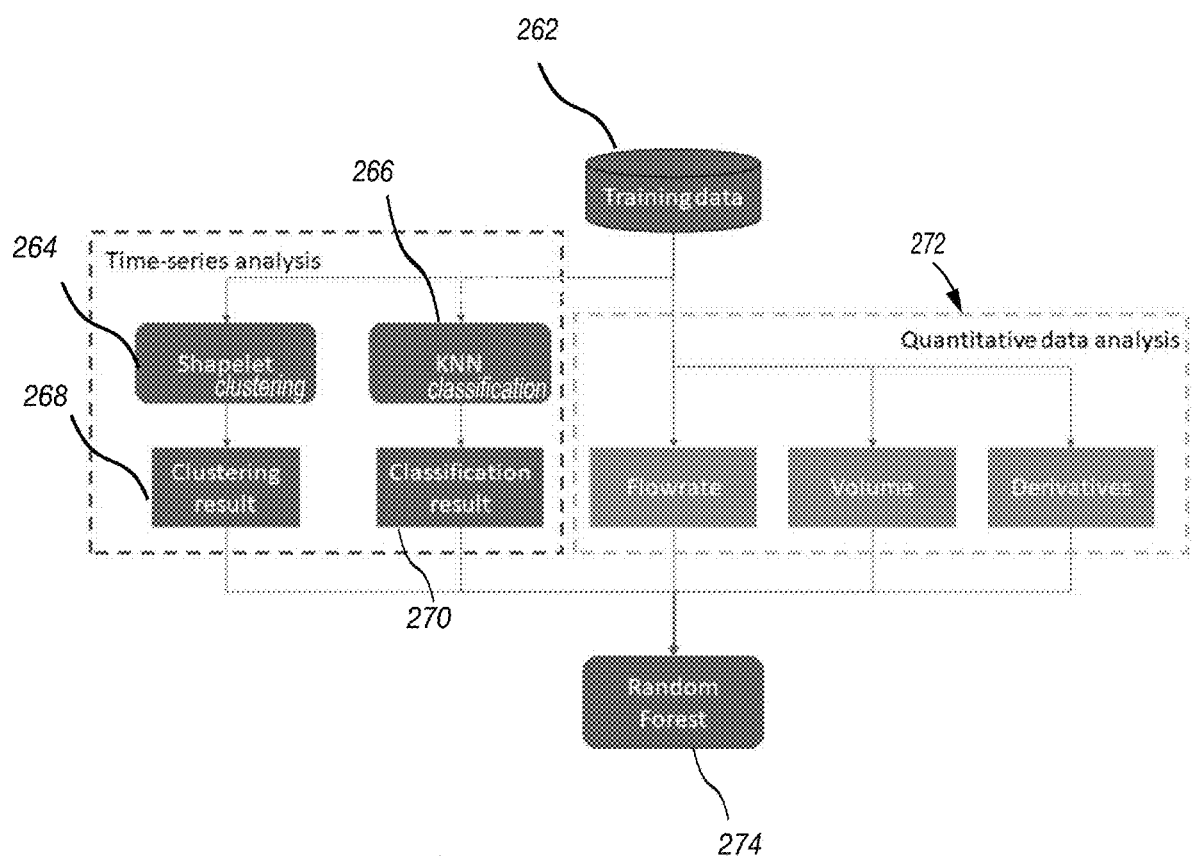
FIG. 13 is a schematic drawing of operations of the method of FIG. 9B

In a third embodiment shown on FIG. 9B, the method includes additional training operations using the pressure time series. Such classification can be interchangeably applied in any order or simultaneously with the previously described clustering. FIG. 13 also shows in more details an example of different data and methods that may be used during the training method.

The method may for instance include preparation of at least an additional clustering (using different method) or classification technique (block 234). This helps adding robustness to the determination even when there are mistakes from the user during the labelling. The additional clustering technique that may be used is unsupervised, not using the labels of the training dataset. Indeed, there are several clustering techniques (hierarchical, density-based, fuzzy, etc.) and another clustering model may be applied in parallel of the clustering method applied that has been already described. When additional clustering method is used, the preparation can include operations such as 116, 118 as previously described. The additional classification method that may be used is supervised, using the labels. Such additional classification method may for instance include support vector machine classification or the k nearest neighbor classification. The preparation may include applying the classification method to each of the subsequences of the training data set. On FIG. 13, the training includes clustering (using shapelet algorithm) of the training dataset 262 as shown in block 264 and the classification of the training dataset 262 using k-nearest neighbors in parallel (block 266). In such embodiment, k is a number that has been determined to be optimal, generally between 3 and 7. The clustering results 268 include a feature relative to the cluster, ie the percentage of the 'normal' event in each clusters. The classification results 270 include the percentage of the 'normal' event in the k nearest neighbors for each of the time series of the training dataset. The k-nearest neighbors may be determined using the same distance metric that is used for the clustering.

The method then includes training (block 220) a supervised algorithm based on the output of the clustering and/or classification results, as well as other relevant features if available and possibly other features and other transformations of the pressure, to learn a predictive function of the labels, i.e. a function that has as an input the different types of clusters for each parameter of a predetermined subsequence as possibly different values and gives as an output a label for the pretest.

As indicated before, the supervised algorithm parameters may be determined before the preparation operation, the learning of the predictive function including using the predetermined parameters (incl. type of supervised algorithm) in combination with the training dataset to obtain the predictive function. This is particularly useful to be able to refine the training set on a regular basis as it has been explained above. In another embodiment, the parameters of the supervised algorithm may be determined during the preparation. Furthermore, the predictive function is the combination of the predetermined parameters of the supervised algorithm and of the training set. The predictive function that is obtained may be stored with a name. Therefore, when testing new pretest data, the user may have access to several pre-trained predictive functions that he can select in view of the environmental context. For instance, several predictive functions may be stored for different type of geological formations or different durations of subsequences. In relationship with FIG. 9A, the supervised algorithm uses as an input a feature (here an identifier) of the respective clusters associated to a each time series (ie pressure and its derivatives) and other relevant features, such as the estimated mobility values. The labels associated with each of the pressure time series are another input. These inputs are used to train a supervised algorithm (e.g., SVM, Naïve Bayes classifier, for instance) to learn the predictive function.

Figure 10:
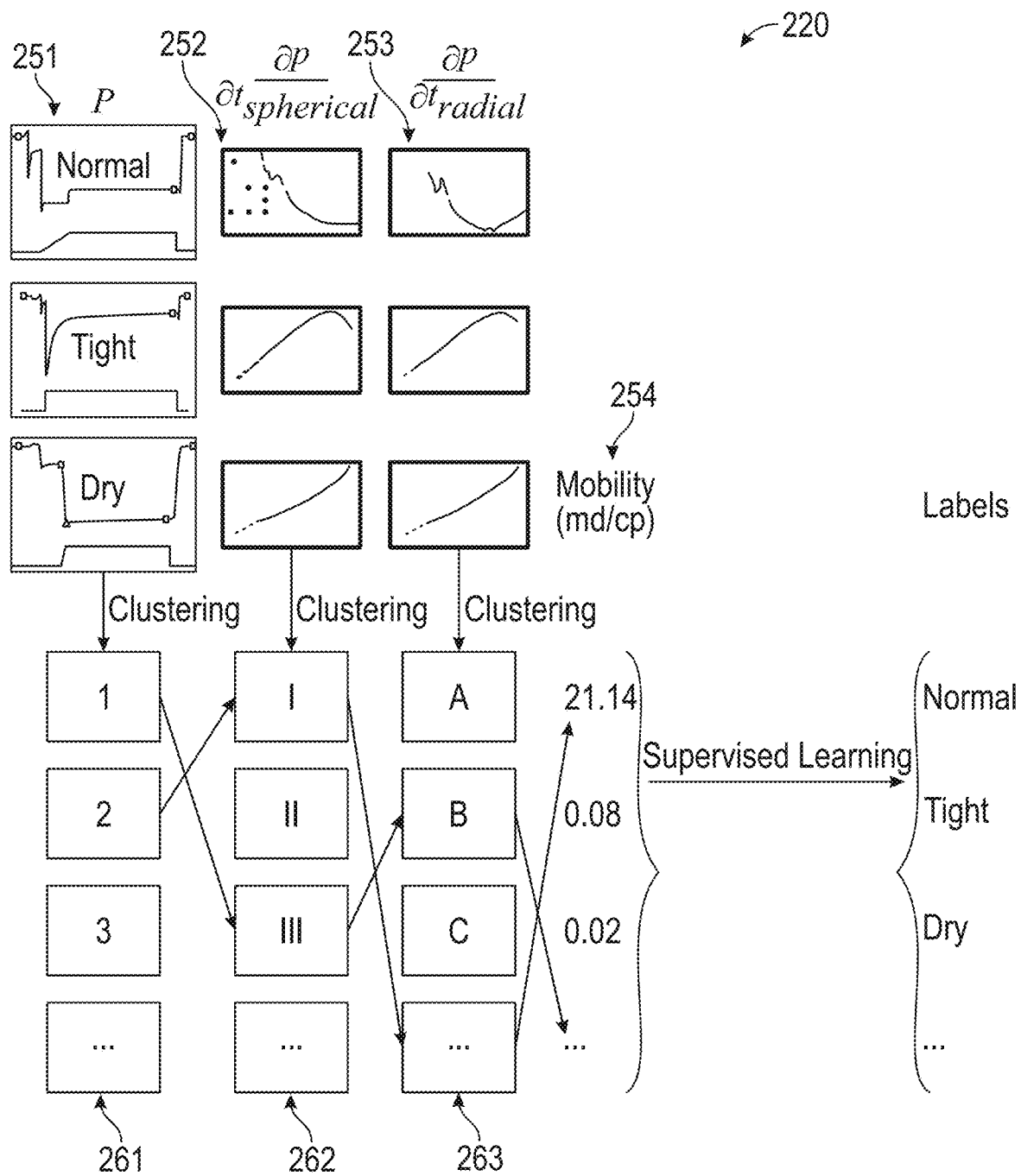
FIG. 10 is a schematic drawing of operations of the method of FIG. 9A.

FIG. 10 shows schematically the operation 220. For each parameter, i.e. pressure and derivatives 251, 252, 253, a dictionary comprising clusters 261, 262, 263 are created and during supervised learning based on a database with labelled time series, the predictive function will determine to which label (i.e. tight, dry or normal) a particular combination of clusters of the first, second and third dictionary all related to the same subsequence will correspond (for instance, cluster 1, III and B). As mentioned earlier, additional parameters that do not take the form of time series, such as mobility 254, may be computed and may be included in the operation and taken into account in the predictive function determination.

The method of FIG. 9B also includes an operation of training a supervised classification algorithm taking into account the previous clustering and/or classification output (ie percentages mentioned above) and other parameters to obtain a predictive function (block 220). The other parameters, when inputted in the classification algorithm, are collected so as to be associated to each pressure time-series of the historical dataset (block 236). The other parameters acquired downhole (while the pretest is ongoing), such as flowrate, volume of fluid drawn into the tool, drawdown mobility, pressure signal noise and variances, and/or computed from parameters acquired downhole, such as one or more pressure derivatives (as explained above) are shown on FIG. 13 as 272. The predictive function may be a decision tree, that may be computed for instance a Random Forest algorithm as shown on FIG. 13 at block 274. Other algorithm may be used to compute a decision tree, such as boosting, light gradient boosting, etc. Of course, other type of predictive function may also be used. The decision tree is built based on the values of the input parameters (classification and clustering results, other parameters acquired and/or computed) and on the labels of the training dataset.

The training operation enables to create a machine learning model. The machine learning model includes the clustering loss function(s) used for the clustering operation(s), and the predictive function. It is based on the parameters and combination of the algorithms that are used (ie clustering, prediction, etc.) but also directly depends on the training dataset that is used. In relationship with the above training operation, particular machine learning models have been used but other models might be built that would enable to obtain conclusive results.

The method then includes, in the determination operation 203, acquiring the pressure build up signal (block 222), i.e. initial parameter, computing the relevant additional parameters time series (i.e. derivatives relative to spherical and radial time) and/or obtaining the additional parameters associated to the pressure build up signal (block 224) and, performing the subsequence extraction and classification (block 226) using at least the trained clustering model. In the embodiment of FIG. 9A, the subsequence extraction 124 is performed for each of the initial and additional parameters and the classification 126 is performed respectively, for each of the parameters, with the first, second and third dictionaries. The output of the operations is a classification as part of a cluster in each of the dictionaries. In the embodiment of FIG. 9B, the method includes performing the subsequence extraction 124 and classification 126 to obtain the cluster to which the subsequence of the time series belong, but as well an additional classification using the additional clustering/classification techniques set up during the training (using for instance the k-nearest neighbors 266, as explained in relationship to FIG. 13). The outputs of the classification are the percentage of the "normal" type in the cluster to which the subsequence belongs and within the k-nearest neighbors of the time series.

The method then includes applying the predictive function to the parameters outputted from the classification and possibly other parameters to assign a predictive label to the pretest (block 228). In the embodiment of FIG. 9A, the input of the predictive function may be the identifier of the respective clusters to which the pressure series and its derivatives belong and additional parameters such as mobility. In the embodiment of FIG. 9B, the parameters are the same input parameters that the ones used for building the decision tree, ie percentages of "normal" labels within the cluster to which the time series belongs and within k-nearest neighbours, as well as additional parameters used for building of the decision tree (for instance, flowrate, volume and one or more derivatives).

In other words, the method may comprise assigning a label to the subsequence using the machine learning model that has been computed during the training operation (including the clustering loss function used for the clustering operation, the predictive function, etc.).

In an embodiment, a confidence level may be computed in association with the label, for instance calculated based on how far the algorithm go in the decision tree (for example of FIG. 9B) or on the number of events assigned with the same label (for a classification mainly based on previously clustered results).

In this particular embodiment, the whole time series is labelled because there is one subsequence of interest selected in each time series but if there were several subsequences of interest a label could be assigned to each subsequence.

As mentioned hereinabove, the method may be performed in real-time at the well site. so as to perform the determination operation 213 while the buildup is ongoing and to label the pretest before the end of the pretest. In such case, when the label for the pretest is obtained, the processor can send the outputted label to a decision module that is situated at the well site (in the downhole tool or at the surface) or remotely. The decision module can take a decision regarding the pretest result (block 230) based on the obtained label and possibly in view of other parameters of the well site as well, and send a command to the well site system, in particular to the tool, based on the decision (block 232). The command sent to the downhole tool may be to continue waiting (if the pretest is determined as a valid pretest) ie carry on with the test or to stop pretest. This decision may take into account the confidence level, for instance the decision to carry on may be taken if the target confidence level has not been obtained. Then the same method may be performed based on a longer subsequence $L_2$ (using a different machine learning model, hence predictive function, that has been trained as explained in relationship with the method but with a different training dataset including subsequences of length $L_2$) until the target confidence level is obtained.

The commands may be sent to other well site equipments such as the winch in addition of the downhole tool or alternatively to the downhole tool, thus saving rig time, minimizing risks of tool sticking while maximizing the chances to acquire valid formation pressure tests in tight formations. In particular, additional command may include updating a job plan, for instance for adding another measurement or pressure test at the same depth but at another azimuthal location to the test plan or to another depth, and/or any other relevant command. By updating the job plan at a high level, commands may be distributed to the relevant wellbore systems taking into account the new job plan.

The method according to the disclosure enables to reliably predict the state of the pretest at an early stage by correlating a large number of reservoir and tool parameters that cannot be handled by humans without having to define a prior cutoff on any specific parameter to enhance robustness of the determination.

Additionally, as it has been explained in relationship with operation 202, the labelled time series may be included in the training dataset (for instance, pre-labelled and validated by the user) in order to refine an existing and/or create a new predictive function.

Figure 14:
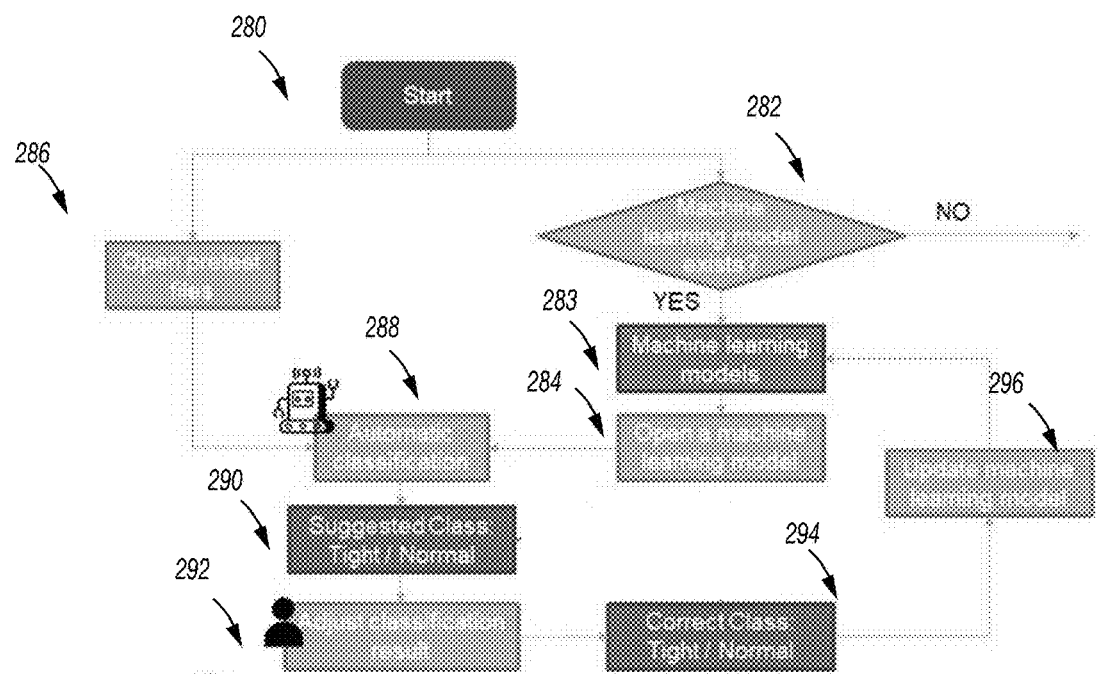
FIG. 14 is a flowchart of a particular operation of a method according to an embodiment of the disclosure.

FIG. 14 summarizes in the following several actions the user may perform in relationship with creation of new machine learning model (including predictive function) in method 280. If there is an existing machine learning model (block 282), the user opens the existing machine learning models 283 (block 284) which may include selecting the appropriate machine learning models if several models are available. The user also opens the pretest files (block 286)— including pressure time series and additional parameters if appropriate—and performs an automatic classification of the pretest files (block 288), corresponding to assigning a label or class 290 to the pretest file using the machine learning model, for instance as described in operations 224-228. The user then adjusts the obtained classification (block 290), which corresponds to validating the classes (ie labels) that are appropriately classified according to the user and to correct the classes that are not appropriately classified according to him. The result of such operation is a corrected class 294. Based on this corrected class, the machine learning may be updated (block 296) and stored as updated as part of the machine learning models. Updating the machine learning models includes performing the training operation with the updated dataset included the newly labelled data.

An indicator of the accuracy of each of the machine learning may be associated to the respective machine learning model. The indicator may be computed based on comparing the labels assigned by the model (suggested class 290) to the validated labels (corrected class 294), and/or by computing an indication of current model robustness (for instance based on distribution of training data within the current classes). Such indicator may be used to show the historical change of accuracy for each update of the machine learning model. Based on such accuracy indicator, the user may choose to store (or not) the updated model, or to modify the training dataset and/or to correct the labels (ie class) assigned to one or more pretest files.

The ability to apply real-time automated and autonomous quality check and classification of the pre-test increase the efficiency of acquisition by removing the need for a "manual" assessment of the pre-test label to take further decision on the next action. This ability may be combined with additional acquisition automation systems (intelligent software or systems) to further automate the pretest acquisition so that the command is automatically sent and executed by the system without any human intervention. The objective is to reduce the variability and increase the efficiency of Pretest Acquisition.

Once they have been determined, the label and the time series can then be added to the training database, possibly after having been checked by an expert.

All of the above described in relationship with the pressure test could be generalized for any signal taking the form of a time series. For instance, in another example, the event detection method may be used as part of acceptance test of devices. In the example below, it will be disclosed how the event detection method is used in relationship with factory acceptance testing of safety valves.

Figure 12:
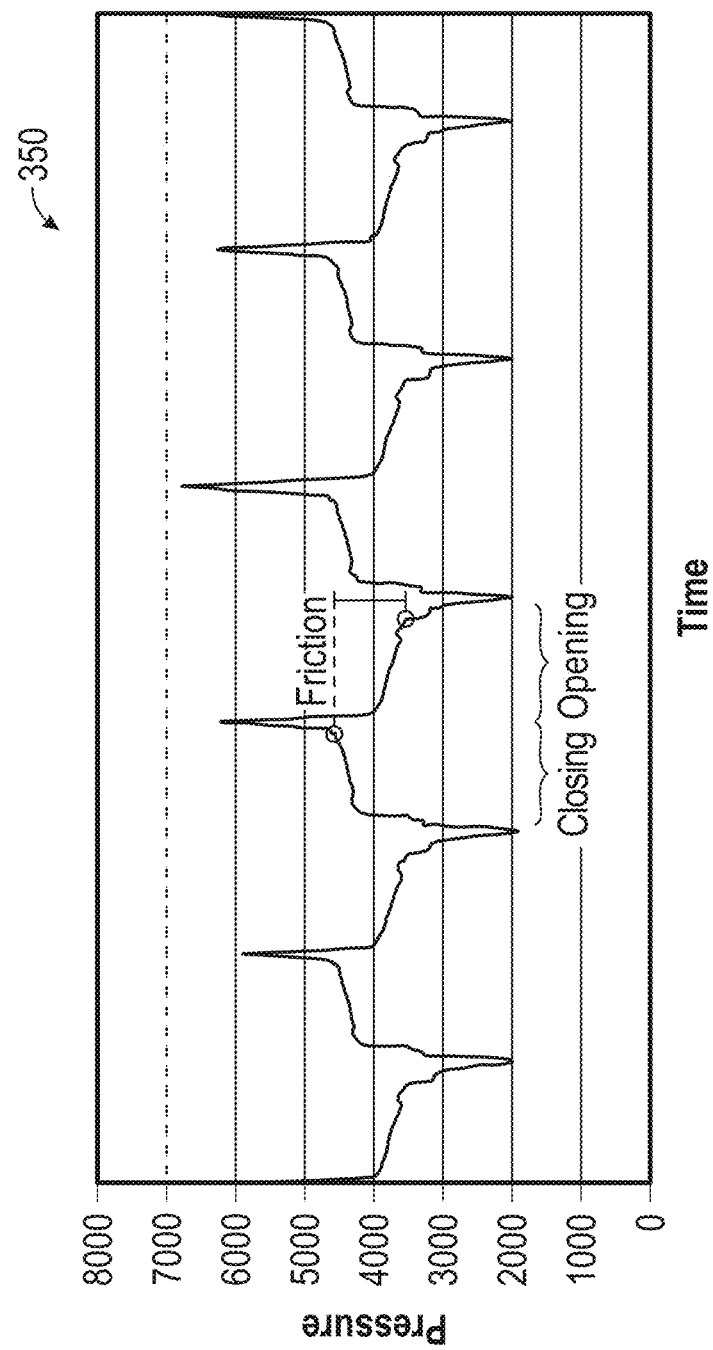
FIG. 12 is an example of a pressure time series taken for another wellsite equipment, ie a downhole valve

Factory acceptance testing of safety valves involve, among other, measuring pressure signals as the valve undergoes multiple open/close cycles. An engineer reviews such time series by eye-locating the patterns corresponding to the openings and closings, and manually reporting the pressure values at several points of interest during each phase. The FIG. 12 below shows an excerpt of such a time series 350 and indicates the locations of one open/close cycle as well as typical points of interest for the engineer. In this example, the pressure difference between the flagged points provides a measure of friction of certain mobile components of the valve. How this friction evolves with the number of open/close cycles provides information about the reliability and aging of the valve.

Hereinafter is disclosed a method for flagging events and points of interest for an acceptance test of a safety valve.

The method first comprises performing the training operation 110 on a set of time series to obtain a dictionary of typical events. The time series may be partially/fully labeled in the sense that some/all points of interest are identified and their time positions are known. In that case, the clusters of the dictionary may contain subsequences of the initial time series on which such points of interest are present. For a given cluster of the dictionary flagging subsequences of interest, one can learn a function predicting the position of the points of interest based on features of the subsequences of interest performing additional operations. Instead of/In addition to providing labeled time series, an interface enables the engineer to directly mark the points of interest on the clustered subsequences. The dictionary formed in the training operation is thus augmented with cluster-specific function predicting the positions of the points of interest on a queried subsequence.

During inference operation 120, open/close cycles are located on a new time series, and proposal points are flagged on each of them.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The disclosure relates to a method for flagging at least an event of interest in an unlabeled time series of a parameter relative to a wellsite (including to the well, formation or a wellsite equipment), wherein the time series of the parameter is a signal of the parameter as a function of time. Such method comprises collecting an unlabeled time series of said parameter, extracting at least an unlabeled subsequence of predetermined duration in the time series, and classifying at least one of the unlabeled subsequences into a cluster of a predetermined set using a loss function representative of the set of clusters. The predetermined set and the loss function have been determined based on a database of training subsequences of predetermined duration. Further, the method includes assigning an event of interest to at least one of the unlabeled subsequences, based on the classification and a predetermined relationship between at least one cluster and at least an event of interest.

The method may comprise an additional training operation including collecting a set of time series of said parameter, extracting, in each time series of the set, one or more of the training subsequences, clustering the extracted training subsequences into the set of clusters, based on shape of signal, and computing the loss function, and, based on the set of training time series, determining the relationship between at least one cluster and at least one of the events of interest. The time series of the set may be labelled time series, in which events have been identified and located in time.

Extracting at least a training and/or an unlabeled subsequence may include passing a rolling window in the time series, each rolling window being an subsequence.

Extracting at least a training and/or an unlabeled subsequence may include pre-selecting a set of training and/or an unlabeled subsequence based on one or more criteria of the subsequence.

The signal in the training and/or an unlabeled subsequence is normalized respectively before the clustering or before the classification. The normalization may include centering and/or scale-normalization.

Determining the relationship may include associating at least one cluster with at least one event of interest.

The parameter may be an initial parameter, the set of clusters is a first set of clusters and the loss function is a first loss function and the method may comprise deriving at least one unlabeled time series of the additional parameters based on the initial parameter, and for the unlabeled time series of additional parameter, extracting, in each time series of the set, one or more unlabeled subsequences of predetermined duration and classifying at least one of the unlabeled subsequences into a cluster of a second predetermined set using a second loss function representative of the clusters. The second predetermined set and the second loss function have been determined based on a database of training subsequences of predetermined length of the additional parameter. In this case, assigning at least an event of interest may be based on the classification of the unlabeled subsequences in the first and second set of clusters.

The method may also comprise deriving at least one time series of one additional parameter based on the initial parameter, and, for the time series of additional parameter, extracting, in each time series of the set, the one or more training subsequences, clustering the extracted training subsequences into the second set of clusters, based on shape of signal, and computing the second loss function representative of the set of clusters. In this embodiment, determining the relationship may include deriving a predictive function based on the clustering of training subsequences of the initial parameter time series, the clustering of training subsequences of the additional parameter time series from supervised learning and assigning at least an event of interest is based on the classification of the unlabeled subsequences in the first and second set of clusters and on the predictive function.

The method may comprise measuring the parameter with one or more sensors. The method may be pressure as in the disclosed examples but may also be any other parameter measured at the well site, such as temperature, resistivity, travel time, load, torque, etc.

In a specific embodiment, the parameter is measured downhole in a pre-test probe during a pre-test operation and the event of interest includes one or more of the following: dry pre-test, tight pre-test or normal pre-test. In this case, one or more of the additional parameters may include at least one derivative of pressure as a function of time.

The method may include communicating the events of interest to one or more devices. These events are identified and located in time. The method may also include commanding based on the assigned event of interest one or more actions at the well site, such as stopping the pre-test operation, or changing the position of the pre-test probe in the formation and perform another pre-test operation, for instance.

In another embodiment, the parameter is measured during operation of a wellsite equipment, such as a valve.

The disclosure also relates to a method for flagging at least an event of interest in an unlabeled time series of a parameter relative to a wellsite, i.e. a signal of the parameter as a function of time. The method comprises a training operation including collecting a set of time series of said parameter, extracting, in each time series of the set, one or more training subsequences of predetermined duration, clustering the extracted training subsequences into a set of clusters, based on shape of signal, and computing a loss function representative of the set of clusters, and, based on the set of training subsequences, determining a relationship between at least one cluster and at least one of the events of interest. The method also comprises an inference operation including collecting an unlabeled time series of said parameter, extracting at least an unlabeled subsequence of predetermined duration in the time series, classifying at least one of the unlabeled subsequences into one of the clusters of the set using the loss function, and assigning at least an event of interest to at least one of the subsequences, based on the classification.

The disclosure also relates to a system for flagging at least an event of interest in an unlabeled time series of a parameter relative to a wellsite, i.e. a signal of the parameter as a function of time, comprising a set of processors comprising one or more processors configured to collect an unlabeled time series of said parameter, extract at least an unlabeled subsequence of predetermined duration in the time series, classify at least one of the unlabeled subsequences into a cluster of a predetermined set using a loss function representative of the clusters, wherein the predetermined set and the loss function have been determined based on a database of training subsequences of predetermined length, and assign at least an event of interest to at least one of the unlabelled subsequences, based on the classification and a predetermined relationship between at least one cluster and at least an event of interest.

The system may also comprise one or more sensors for measuring the parameter, such as pressure. The one or more sensors may be downhole sensors.

The set of processors may comprise a command module to send a command to one or more wellsite based on the assigned event of interest.

The set of processors may also be configured to collect a set of time series of said parameter, extract, in each time series of the set, one or more of the training subsequences, cluster the extracted training subsequences into the set of clusters, based on shape of signal, and computing the loss function, and, based on the set of training subsequences, determine the relationship between at least one cluster and at least one of the events of interest.

One or more of the processors of the set may be located at the wellsite.

The disclosure also relates to a computer program product comprising a non-transitory, computer-readable medium having code recorded thereon for causing a processor to perform at least a portion of the method.

The disclosure also relates to a method for evaluating a pressure test performed in a borehole formed in a geological formation, comprising collecting an unlabeled pressure time series relative to the formation acquired during the pressure test, extracting one or more subsequences of predetermined duration from the time series, wherein the subsequence is representative of a buildup phase of the pressure test. The method also includes assigning a label representative of the status of the pressure test based on the at least one extracted subsequence, using at least a predictive function. The predictive function has been determined using a dataset of labelled pressure time series. The method includes sending a command to a wellsite operating system based on the assigned label.

More generally, the disclosure also relates to a method for evaluating a downhole operation performed in a borehole formed in a geological formation, comprising collecting an unlabelled time series relative to the formation, extracting at least a subsequence of predetermined duration from the time series, assigning a label to the extracted subsequence series, using at least a predictive function, wherein the predictive function has been determined using a dataset of labelled subsequences of predetermined duration, and sending a command to a wellsite operating system based on the assigned label.

Each of the two methods disclosed above may comprise one or more of the followings features as mentioned below.

When the method relates to a pressure test, it may include connecting a flowline of a downhole tool to the geological formation, drawing fluid from the formation using the flowline, and acquiring the unlabeled pressure time series using the downhole tool. The pressure time series is acquired in the flowline, and the buildup phase corresponds to a phase during which the flowline is connected to the formation and the downhole tool has stopped drawing fluid from the formation. The labels may include at least two of the following labels: dry pressure test, normal pressure test, tight pressure test.

In an embodiment, assigning the label includes classifying the extracted subsequence into a predetermined cluster of a set of clusters using a clustering loss function representative of the set of clusters. The set and the clustering loss function have been determined using a dataset of labelled (pressure) time series, wherein a feature relative to the predetermined cluster is an input of the predictive function. The feature may be an identifier of the cluster and/or percentage of time series associated to a predetermined label in said cluster.

The predictive function may be representative of a relationship between at least one cluster and at least a label.

Assigning the label may include classifying the extracted subsequence using an additional classification method, wherein an output of the classification method is an input to the predictive function. The additional classification method may be a k nearest neighbor classification. In the latter case, the output of the additional classification method may be a percentage of a time series having a predetermined label within the k nearest neighbors.

Alternatively or additionally, the set of clusters may be a first set of cluster and the clustering loss function may be a first clustering loss function, and the method may comprises computing at least a time series of an additional parameter derived from the pressure, and for the time series of the additional parameter extracting one or more subsequences of predetermined duration representative of the buildup phase of the pressure test, and classifying the at least one of the subsequences into a second predetermined cluster of a second set of clusters using a second clustering loss function representative of the clusters of the second set, wherein the second set and the second clustering loss function have been determined based on labelled time series representative of the additional parameter, wherein a feature relative to the second predetermined cluster is an input to the predictive function. The additional parameter may be a pressure first or second derivative.

The method may comprise acquiring at least an additional downhole parameter associated to the downhole operation (ie pressure test). The predictive function uses the at least one downhole parameter as an input, wherein the predictive function has been trained using labelled (pressure) time series and the associated downhole parameter. The additional downhole parameter may be a flow rate, a mobility, a volume or a pressure derivative.

In an embodiment, the predictive function includes a decision tree.

The method may include a training operation including collecting a set of labelled (pressure) time series, extracting, in each time series of the set, one or more training subsequences of predetermined duration, for instance, for a pressure test, representative of the buildup phase, and using a supervised algorithm to determine the predictive function based on the extracted training subsequences and corresponding labels. The training operation may include clustering the extracted training subsequences into the set of clusters, based on shape of signal, and computing the clustering loss function, and determining the predictive function using the clusters. In an embodiment, the training operation includes an additional classification of the labelled time series, wherein the supervised algorithms uses an output of the additional classification to determine the predictive function.

In an embodiment, the supervised algorithm to determine the predictive function during the training operation uses at least an additional downhole parameter associated to the labelled pressure time series, and the method comprises collecting the at least an additional downhole parameter associated to the unlabeled pressure time series and assigning the label using the at least one additional downhole parameter, wherein the predictive function uses the at least one additional downhole parameter as an input.

The training operation may also include selecting the dataset of labelled pressure time series from a database of labelled pressure time series based on one or more criteria. The one or more criteria may include the location of the pressure test, the properties of the geological formation, or an user that has validated the labelled pressure time series.

In an embodiment, an unlabeled pressure time series is normalized before assigning the label. The normalization may for instance include centering and/or scale-normalization. In an embodiment, the unlabeled pressure time series is normalized using a predetermined normalization technique and, during the training operation, the labelled time series are normalized using the normalization before determining the predictive function.

In an embodiment, sending a command includes sending a command to a downhole tool to stop or carry on with the pressure test. Sending a command may alternatively or additionally include sending a command to modify a job plan.

In an embodiment, a confidence level is computed in relationship with the assigned label. In particular, the predetermined duration may be a first predetermined duration, and the predictive function a first predictive function associated to the first predetermined duration. The method may then include comparing the confidence level to a threshold and, based on comparison, performing the extraction of a subsequence of a second predetermined duration longer than the first duration from the pressure time series and the assignment of the label based on a second predictive function associated to the second duration.

The disclosure also relates to a system for evaluating a downhole operation performed in a borehole formed in a geological formation, comprising a processing system configured to collect an unlabeled time series relative to the geological formation, extract at least a subsequence of predetermined duration from the time series, assign a label representative of the status of the downhole operation based at least on the extracted subsequence, using at least a predictive function, wherein the predictive function has been determined using a dataset of labeled subsequences of predetermined duration, and to send a command to a wellsite operating system based on the assigned label. In an embodiment, the system further comprises a downhole tool for acquiring the unlabeled time series. The processing system may be configured to perform one or more operations of the method as disclosed above.

The downhole operation may be a pressure test, and the downhole tool may have a flowline connectable to the geological formation and configured to draw fluid from the geological formation using the flowline, and a pressure sensor disposed in the flowline configured to acquire the unlabeled time series, wherein the unlabeled time series is a pressure time series.

The invention claimed is:

1. A method for flagging one or more events of interest in an unlabeled time series of a parameter relative to a wellsite, wherein the time series of the parameter is a signal of the parameter as a function of time, wherein the method comprises:
   i. collecting, via a processor, the unlabeled time series of said parameter obtained by one or more sensors,
   ii. extracting, via the processor, one or more unlabeled subsequences of a predetermined duration in the time series,
   iii. classifying, via the processor, at least one of the one or more unlabeled subsequences into a cluster of a predetermined set of clusters using a clustering loss function representative of the predetermined set of clusters, wherein the predetermined set of clusters and the clustering loss function have been determined based on a database of training subsequences of the predetermined duration in generating a dictionary of events accessible by the processor, wherein each cluster of the predetermined set of clusters represents a type of event of interest and each training subsequence of the database of training subsequences is assigned to a respective cluster of the predetermined set of clusters as a portion of the dictionary of events,
   iv. assigning, via the processor, at least one event of interest of the one or more events of interest as an assigned event of interest to the at least one of the one or more unlabeled subsequences, based on the classification and on a predetermined relationship between at least one cluster of the predetermined set of clusters and the type of event of interest, wherein the predetermined relationship is based on an assessment of individual cluster members that define each cluster of the predetermined set of clusters and predefined event occurrences amongst the individual cluster members, and
   v. sending, via the processor, a command based on the assigned event of interest to a downhole tool or another element of a wellsite operating system to trigger one or more actions at the wellsite.

2. The method of claim 1, comprising measuring the parameter with the one or more sensors.

3. A method for evaluating a pressure test performed in a borehole formed in a geological formation, comprising:
   i. collecting, via a processor, an unlabeled pressure time series relative to the formation acquired during the pressure test by one or more sensors,
   ii. extracting, via the processor, at least one subsequence of predetermined duration from the time series, wherein the subsequence is representative of a buildup phase of the pressure test,
   iii. assigning, via the processor, a label as an assigned label representative of a status of the pressure test based on the at least one extracted subsequence, using at least a predictive function, wherein the predictive function has been determined using a dataset of labelled pressure time series that comprises at least two mutually exclusive data categories each associated with a distinct label selected from a group consisting of normal test, tight test and dry test, and
   iv. sending, via the processor, a command based on the assigned label to a downhole tool or another element of a wellsite operating system to trigger one or more actions at a wellsite.

4. The method of claim 3, wherein collecting, via the processor, the unlabeled pressure time series comprises connecting a flowline of the downhole tool to the geological formation, drawing fluid from the formation using the flowline, and acquiring the unlabeled pressure time series using the downhole tool, wherein the unlabeled pressure time series is acquired in the flowline, wherein the buildup phase corresponds to a phase during which the flowline is connected to the formation and the downhole tool has stopped drawing fluid from the formation.

5. The method of claim 3, wherein assigning the label includes classifying the extracted subsequence into a predetermined cluster of a set of clusters using a clustering loss function representative of the set of clusters, wherein the set of clusters and the clustering loss function have been determined using the dataset of labelled pressure time series, wherein a feature relative to the predetermined cluster is an input of the predictive function.

6. The method of claim 5, wherein assigning the label includes classifying the extracted subsequence using an additional classification method, wherein an output of the classification method is an input to the predictive function.

7. The method of claim 5, wherein the set of clusters is a first set of cluster and the clustering loss function is a first clustering loss function, wherein assigning the label comprises computing at least a time series of a parameter derived from pressure, and for the time series of the parameter:
   i. extracting one or more subsequences of predetermined duration representative of the buildup phase of the pressure test, and
   ii. classifying the at least one of the subsequences into a second predetermined cluster of a second set of clusters using a second clustering loss function representative of the clusters of the second set, wherein the second set and the second clustering loss function have been determined based on labelled time series representative of the parameter, wherein a feature relative to the second predetermined cluster is an input to the predictive function.

8. The method of claim 3, comprising acquiring at least one downhole parameter associated to the pressure test, wherein the predictive function uses the at least one downhole parameter as an input, wherein the predictive function has been trained using the labelled pressure time series and the associated downhole parameter.

9. The method of claim 8, wherein the parameter is a flow rate, a mobility, a volume or a pressure derivative with respect to time.

10. The method of claim 3, wherein the predictive function includes a decision tree generated based at least in part on the dataset of labelled pressure time series.

11. The method of claim 3, comprising a training operation including collecting the dataset of labelled pressure time series, extracting, in each time series of the dataset, of labelled pressure time series, one or more training subsequences of predetermined duration representative of the buildup phase, of the pressure test, and using a supervised algorithm to determine the predictive function based on the extracted training subsequences and their associated labels.

12. The method of claim 11, wherein the supervised algorithm to determine the predictive function during the training operation uses at least one downhole parameter associated to the dataset of labelled pressure time series, wherein the method comprises collecting the at least one downhole parameter associated to the unlabeled pressure time series and assigning the label using the at least one downhole parameter, wherein the predictive function uses the at least one downhole parameter as an input.

13. The method of claim 11, wherein the training operation includes selecting the dataset of labelled pressure time series from a database of labelled pressure time series.

14. The method of claim 3, wherein an unlabeled pressure time series is normalized before assigning the label.

15. The method of claim 3, wherein sending the command to the downhole tool triggers stopping or continue with the pressure test as the one or more actions at the wellsite.

16. The method of claim 3, wherein a confidence level is computed in relationship with the assigned label.

17. The method of claim 16, wherein the predetermined duration is a first predetermined duration, wherein the predictive function is a first predictive function associated to the first predetermined duration and wherein the method includes comparing the confidence level to a threshold and based on comparison, performing the extraction of a subsequence of a second predetermined duration longer than the first duration from the pressure time series and the assignment of the label based on a second predictive function associated to the second duration.

18. A system for evaluating a downhole operation performed in a borehole formed in a geological formation, comprising a processing system configured to:
  i. collect, via a processor of the processing system, an unlabeled time series of a parameter obtained by one or more sensors relative to the geological formation,
  ii. extract, via the processor of the processing system, at least a subsequence of predetermined duration from the time series,
  iii. assign, via the processor of the processing system, a label as an assigned label representative of a status of the downhole operation based at least on the extracted subsequence, using at least a predictive function, wherein the predictive function has been determined using a dataset of labeled subsequences of predetermined duration that comprises at least two mutually exclusive data categories each associated with a distinct label selected from a group consisting of normal test, tight and dry test labels, and
  iv. send, via the processor of the processing system, a command based on the assigned label to a downhole tool or another element of a wellsite operating system to trigger one or more actions at a wellsite.

19. The system of claim 18, further comprising the downhole tool configured to acquire the unlabeled time series.

* * * * *